(12) United States Patent
Ely et al.

(10) Patent No.: US 10,960,509 B2
(45) Date of Patent: Mar. 30, 2021

(54) LIGHTING SYSTEMS FOR POWER TOOLS

(71) Applicant: Ingersoll-Rand Industrial U.S., Inc., Davidson, NC (US)

(72) Inventors: Sean C. Ely, Flemington, NJ (US); Jason Christopher Bartoszek, Bethlehem, PA (US); Thomas S. Dougherty, Mooresville, NC (US); Kevin Heinrichs, Lopatcong, NJ (US); Douglas Fornell Leavitt, Bethelehem, PA (US); Dennis Naksen, Summit, NJ (US); Warren A. Seith, Bethlehem, PA (US); Joshua Odell Johnson, Allentown, PA (US); Pinhua Xie, Kendall Park, NJ (US); Timothy Richard Cooper, Titusville, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 15 days.

(21) Appl. No.: 16/107,859

(22) Filed: Aug. 21, 2018

(65) Prior Publication Data
US 2019/0001457 A1    Jan. 3, 2019

Related U.S. Application Data

(63) Continuation of application No. 15/172,247, filed on Jun. 3, 2016, now Pat. No. 10,052,733.

(51) Int. Cl.
*B23Q 17/24* (2006.01)
*B25B 21/02* (2006.01)
(Continued)

(52) U.S. Cl.
CPC .......... *B23Q 17/2404* (2013.01); *B25B 21/02* (2013.01); *B25B 23/18* (2013.01); *B25F 5/00* (2013.01)

(58) Field of Classification Search
USPC ......................................................... 362/119
See application file for complete search history.

(56) References Cited

U.S. PATENT DOCUMENTS

2,855,679 A    10/1958  Gibble
5,738,177 A     4/1998  Schell et al.
(Continued)

FOREIGN PATENT DOCUMENTS

CN        104676315 A      6/2015
DE   10 2004 051913 A1     2/2006
(Continued)

OTHER PUBLICATIONS

International Search Report dated Dec. 5, 2018; CN 201680031710.8; Filing Date Jun. 3, 2016.
(Continued)

*Primary Examiner* — Rafferty D Kelly
(74) *Attorney, Agent, or Firm* — Kevin E. West; Advent, LLP

(57) ABSTRACT

An illustrative embodiment of the present disclosure provides hand-held power tool which includes a housing, a motor, and an output spindle. The housing supports a motor having a rotor configured to rotate when the motor is supplied with power. The output spindle protrudes from an output end of the housing, and is functionally coupled to the rotor such that the output spindle rotates in response to a rotation of the rotor. The housing also supports at least one electrical accessory that is connectable to an external power connector located on the housing.

20 Claims, 14 Drawing Sheets

(51) Int. Cl.
*B25B 23/18* (2006.01)
*B25F 5/00* (2006.01)

(56) References Cited

U.S. PATENT DOCUMENTS

| | | |
|---|---|---|
| 2002/0172035 A1 | 11/2002 | Hara et al. |
| 2008/0025017 A1 | 1/2008 | Tadokoro et al. |
| 2008/0122302 A1* | 5/2008 | Leininger ............... B25F 5/021 |
| | | 310/50 |
| 2011/0109093 A1 | 5/2011 | Leininger |
| 2011/0188232 A1* | 8/2011 | Friedman ................ B25B 21/00 |
| | | 362/119 |
| 2014/0036482 A1 | 2/2014 | Vanko et al. |

FOREIGN PATENT DOCUMENTS

| | | |
|---|---|---|
| DE | 20 2006 018761 U1 | 2/2007 |
| EP | 2524775 A2 | 11/2012 |
| EP | 2687338 A1 | 1/2014 |

OTHER PUBLICATIONS

International Search Report dated Feb. 28, 2019; EP 16804509.4
Filing Date Jun. 3, 2016.

* cited by examiner

LIGHTING SYSTEMS FOR POWER TOOLS

RELATED APPLICATIONS

The present application is a continuation of U.S. patent application Ser. No. 15/172,247, filed on Jun. 3, 2016, which claims priority to U.S. Provisional Patent Application Ser. No. 62/171,791, filed on Jun. 5, 2015, entitled "Lighting Systems for Power Tools," both of which are expressly incorporated by reference herein.

TECHNICAL FIELD AND SUMMARY

The present disclosure relates, generally, to power tools and, more particularly, to lighting systems for power tools.

An illustrative embodiment of the present disclosure provides hand-held power tool which comprises a housing assembly, a motive source, an output spindle, at least one handle, and a nosepiece. The housing assembly supports the motive source. The output spindle protrudes from an output end of the housing assembly, and is functionally coupled to the motive source such that the output spindle rotates in response to activation of the motive source when the motive source is supplied with power. The at least one handle extends from the housing assembly, and includes a trigger configured to be actuated to initiate a plurality of functions. The nosepiece is removably attached to the output end of the housing assembly. The nosepiece supports one or more chip-on-board (COB) light emitting diodes (LED) to illuminate a work space. The one or more COB LED is located adjacent the output spindle. Actuation of the trigger initiates the functions selected from the group consisting of turning on the one or more COB LED, turning off the plurality of COB LED, adjusting brightness of the one or more COB LED. Additionally, the nosepiece and the housing assembly form an electrical connection assembly that provides electrical power to the nosepiece. The electrical connection assembly includes a first electrical connector supported by the nosepiece configured to mate with a second electrical connector supported on the housing assembly. Electrical power is supplied from an electrical power source to the electrical connection assembly and to the one or more COB LED.

In the above and other embodiments of the present disclosure may also comprise: the one or more COB LED form a path adjacent at least a portion of the output spindle, wherein the path being selected from the group consisting of an annular ring around the output spindle, one or more linear paths, one or more curved paths, and U-shaped pattern; actuation of the trigger supplies power to a controller, wherein the controller initiates the plurality of functions of the one or more COB LED selected from the group consisting of operating as a visual indicator, an operational condition of the power tool, and aesthetic lighting; initiating at least one function of the plurality of functions being caused by actuating the trigger multiple times; a protective lens coupled to the nosepiece and covering the one or more COB LED to prevent contamination or damage to the one or more COB LED as well as wires, and connections related to the one or more COB LED; a timer electrically connected to a controller such that initiating at least one function of the plurality of functions caused by actuating the trigger sets the timer to maintain illumination of the one or more COB LED for a pre-determined duration of time; the trigger being configured such that when the trigger is partially depressed the trigger activates the one or more COB LED, and wherein when the trigger is further partially depressed the trigger activates the motive source; an annular flange surrounding the output spindle at the output end of the housing assembly, wherein the nosepiece includes at least one retaining clip that engages the annular flange to selectively couple the nosepiece with the housing assembly; the at least one retaining clip is a plurality of retaining clips located at the periphery of an aperture disposed through the nosepiece that receives the output spindle and the annular flange surrounding the output spindle, wherein the plurality of retaining clips engage the annular flange selectively attach the nosepiece to the annular flange; an overmolding that covers an exterior surface of the nosepiece including at least a portion of the at least one retaining clip, but the overmolding does not shroud light emitting from the one or more COB LED; the overmolding being made of rubber; an overmolding on at least a portion of the nosepiece that forms a seal at the protective lens to prevent contamination or damage to the one or more COB LED; the electrical connection assembly of the nosepiece and the housing assembly includes a male terminal assembly that mates with a corresponding female terminal assembly to create the electrical connection between the nosepiece and the housing assembly, wherein the male and female terminal assemblies connect when the nosepiece and housing assembly removably attach to each other; the male terminal assembly includes at least one electrical conducting pin and the female terminal assembly includes at least one electrical conducting socket configured to receive the at least one electrical conducting pin; the at least one electrical conducting pin includes first and second electrical conducting blades and the at least one electrical conducting socket includes first and second electrical conducting sockets configured to receive the first and second electrical conducting blades, respectively, wherein each of the first and second electrical conducting sockets are made from a pair of opposing beams that form a pincer near ends of the pair of opposing beams which are spaced apart from each other, and wherein the ends of the pair of opposing beams are flared outward from each other to assist guiding first and second electrical conducting blades into a slot defined between the two beams; the nosepiece includes a piloting member that extends from the nosepiece and is configured to guide the nosepiece to mate the female and male terminal assemblies, assist removably attaching the nosepiece to the housing assembly, and cover the electrical connection assembly; the piloting member being composed of at least one flange configured to interface with a receiving structure on the housing assembly to guide the nosepiece onto the housing assembly; a forward/neutral/reverse (F/N/R) switch, wherein when the F/N/R switch is in a neutral mode, the rotor of the motor does not rotate when the trigger is depressed but the trigger does make an electrical connection to power the one or more COB LED; the F/N/R switch being coupled to a lever configured to move the switch to select either a forward mode, the neutral mode, or a reverse mode; a controller connected to the electrical power source, wherein the controller being configured to manage a plurality of processes associated with operation of the hand-held power tool, wherein the controller includes a processor, a memory, and an input/output subsystem; and the controller being configured to provide power and control signals to the one or more COB LED.

Another illustrative embodiment of the present disclosure provides hand-held power tool which comprises a housing assembly, a motive source, an output spindle, and a handle. The housing assembly supports the motive source. The output spindle protrudes from an output end of the housing assembly, and is functionally coupled to the motive source such that the output spindle rotates in response to activation of the motive source when the motive source is supplied with power, the handle extends from the housing, and includes a trigger configured to be actuated to initiate a plurality of functions. The housing supports one or more of chip-on-board (COB) light emitting diodes (LED) at the output end of the housing. The one or more of COB LED are located adjacent the output spindle, and are configured to turn on, off, and vary in brightness.

In the above and other embodiments of the present disclosure may also comprise: actuation of the trigger initiates the plurality of functions of turning on, turning off, and adjusting brightness of the one or more COB LED; a nosepiece removably attached to the output end of the housing; a nosepiece configured to direct light illuminated from the one or more COB LED toward a work space adjacent the output spindle; a nosepiece, wherein the nosepiece and the housing form an electrical connection assembly that provides electrical power to the nosepiece, wherein the electrical connection assembly includes a first electrical connector supported by the nosepiece configured to mate with a second electrical connector supported on the housing; and wherein the electrical power is supplied from an electrical power source to the electrical connection assembly; the one or more COB LED forms a path adjacent at least a portion of the output spindle, wherein the path is selected from the group consisting of an annular ring around the output spindle, one or more linear paths, one or more curved paths, and U-shaped pattern; actuation of the trigger initiates the plurality of functions of the one or more COB LED selected from the group consisting of operating as a visual indicator, an operational condition of the power tool, and aesthetic lighting; initiating at least on function of the plurality of functions being caused by actuating the trigger multiple times; a protective lens covering the one or more COB LED to prevent contamination or damage to the one or more COB LED as well as wires and connections related to the one or more COB LED; a timer electrically connected to a controller such that initiating at least one function of the plurality of functions caused by actuating the trigger sets the timer to maintain illumination of the one or more COB LED for a pre-determined duration of time; the trigger being configured such that when the trigger is partially depressed the trigger activates the one or more COB LED, and wherein when the trigger is further partially depressed the trigger activates the motive source; a forward/neutral/reverse (F/N/R) switch, wherein when the F/N/R switch is in a neutral mode, the rotor of the motor does not rotate when the trigger is depressed but the trigger does make an electrical connection to power the one or more COB LED; the F/N/R switch is coupled to a lever configured to move the switch to select either a forward mode, the neutral mode, or a reverse mode; a controller connected to the electrical power source, wherein the controller is configured to manage a plurality of processes associated with operation of the hand-held power tool, wherein the controller includes a processor, a memory, and an input/output subsystem; and the controller being configured to provide power and control signals to the one or more COB LED.

Another illustrative embodiment of the present disclosure provides hand-held power tool which comprises a housing assembly, a motive source, and an output spindle. The housing assembly supports the motive source. The output spindle protrudes from an output end of the housing assembly, and is functionally coupled to the motive source such that the output spindle rotates in response to activation of the motive source when the motive source is supplied with power. The housing supports one or more chip-on-board (COB) light emitting diodes (LED) at the output end of the housing, and the one or more COB LED are located adjacent the output spindle.

In the above and other embodiments of the present disclosure may also comprise: a handle extending from the housing and a trigger operatively coupled to the handle, wherein the trigger is configured to be actuated to initiate a plurality of functions; the one or more COB LED are configured to turn on, off, and vary in brightness; actuation of the trigger initiates the plurality of functions selected from the group consisting of turning the one or more COB LED on, off, and adjusting brightness; a nosepiece removably attached to the output end of the housing; a nosepiece configured to direct light illuminated from the one or more COB LED toward a work space adjacent the output spindle; a nosepiece, wherein the nosepiece and the housing form an electrical connection assembly that provides electrical power to the nosepiece, wherein the electrical connection assembly includes a first electrical connector supported by the nosepiece configured to mate with a second electrical connector supported by the housing, and wherein electrical power is supplied from an electrical power source to the electrical connection assembly; the one or more COB LED form a path adjacent at least a portion of the output spindle, wherein the path is selected from the group consisting of an annular ring around the output spindle, one or more linear paths, one or more curved paths, and U-shaped pattern; actuation of the trigger initiates the plurality of functions of the one or more COB LED selected from the group consisting of operating as a visual indicator, an operational condition of the power tool, and aesthetic lighting; initiating at least one function of the plurality of functions being caused by actuating the trigger multiple times; a protective lens covering the one or more COB LED to prevent contamination or damage to the one or more COB LED as well as wires and connections related to the one or more COB LED; a timer electrically connected to a controller such that initiating at least one function of the plurality of functions caused by actuating the trigger sets the timer to maintain illumination of the one or more COB LED for a predetermined duration of time; the trigger being configured such that when the trigger is partially depressed the trigger activates the one or more COB LED, and wherein when the trigger is further partially depressed the trigger activates the motive source; a forward/neutral/reverse (F/N/R) switch, wherein when the F/N/R switch is in a neutral mode, the rotor of the motor does not rotate when the trigger is depressed but the trigger does make an electrical connection to power the one or more COB LED; the F/N/R switch being coupled to a lever configured to move the switch to select either a forward mode, the neutral mode, or a reverse mode; and a controller connected to the electrical power source, wherein the controller is configured to manage a plurality of processes associated with operation of the hand-held power tool, wherein the controller includes a processor, a memory, and an input/output subsystem.

Another illustrative embodiment of the present disclosure provides hand-held power tool which comprises a housing, a motor, and an output spindle. The housing supports a motor having a rotor configured to rotate when the motor is supplied with power. The output spindle protrudes from an output end of the housing, and is functionally coupled to the rotor such that the output spindle rotates in response to a rotation of the rotor. The housing also supports at least one electrical accessory that is connectable to an external power connector located on the housing.

In the above and other embodiments of the present disclosure may also comprise: the at least one electrical accessory being selected from the group consisting of a chip-on-board (COB) light emitting diodes (LED), RFID transceiver, power port, sensor, fan, and diagnostic device.

Another illustrative embodiment of the present disclosure provides hand-held power tool which comprises a housing, an output spindle, one or more headlights, a forward/neutral/reverse (F/N/R) switch, and a trigger. The housing assembly supports the motive source. The output spindle protrudes from an output end of the housing assembly, and is functionally coupled to the motive source such that the output spindle rotates in response to activation of the motive source when supplied with power. The one or more headlights is positioned on the output end of the housing, and is configured to illuminate a work space of the power tool. The forward/neutral/reverse (F/N/R) switch is supported in the housing, and configured to control the motor such that (i) the rotor rotates in one direction when the F/N/R switch is in a forward position, (ii) the rotor rotates in an opposite direction when the F/N/R switch is in a reverse position, and (iii) the rotor is restricted from rotating when the F/N/R switch is in a neutral position. The trigger supported in the housing and configured to control the supply of power to the motor when the F/N/R switch is in the forward and reverse positions and to control operation of the one or more headlights when the F/N/R switch is in the neutral position.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
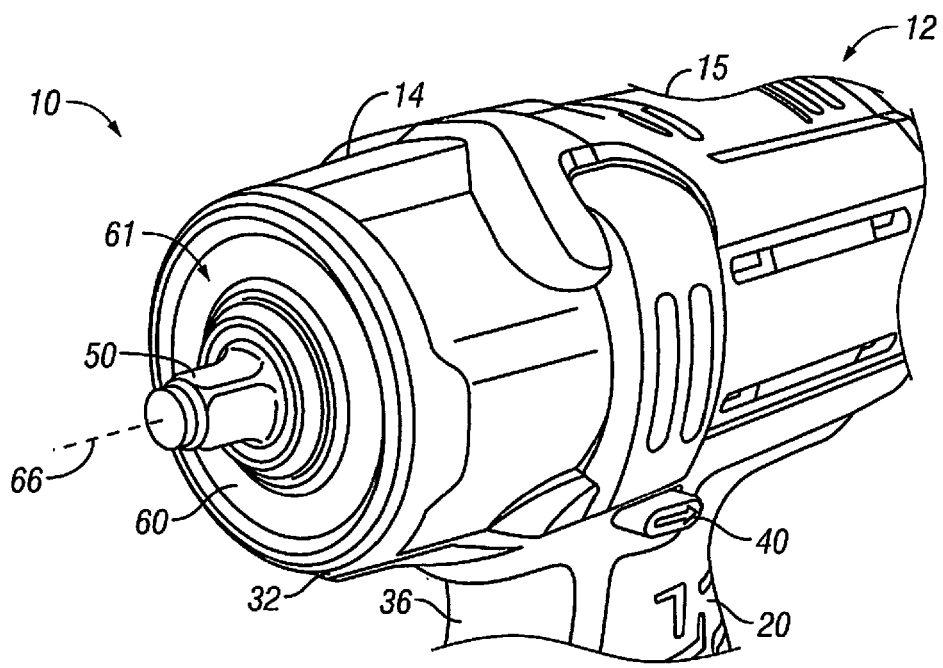
FIG. 1 is a perspective view of one illustrative embodiment of a power tool.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention.

Figure 2:
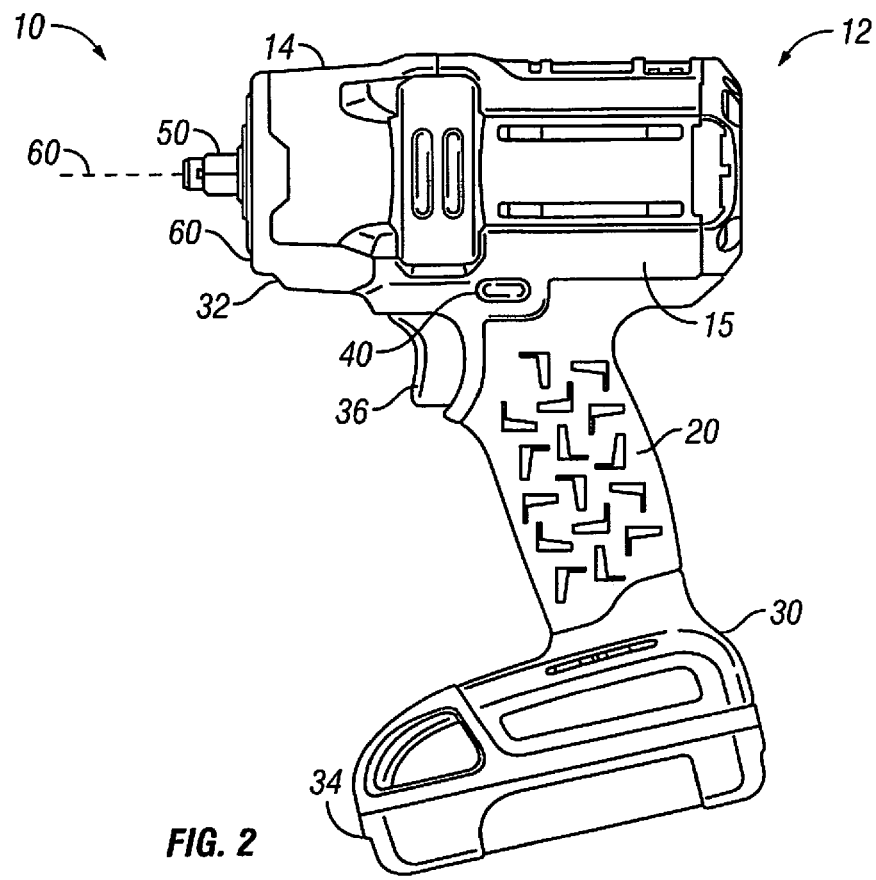
FIG. 2 is a side elevation view of the power tool of FIG. 1.
Figure 3:
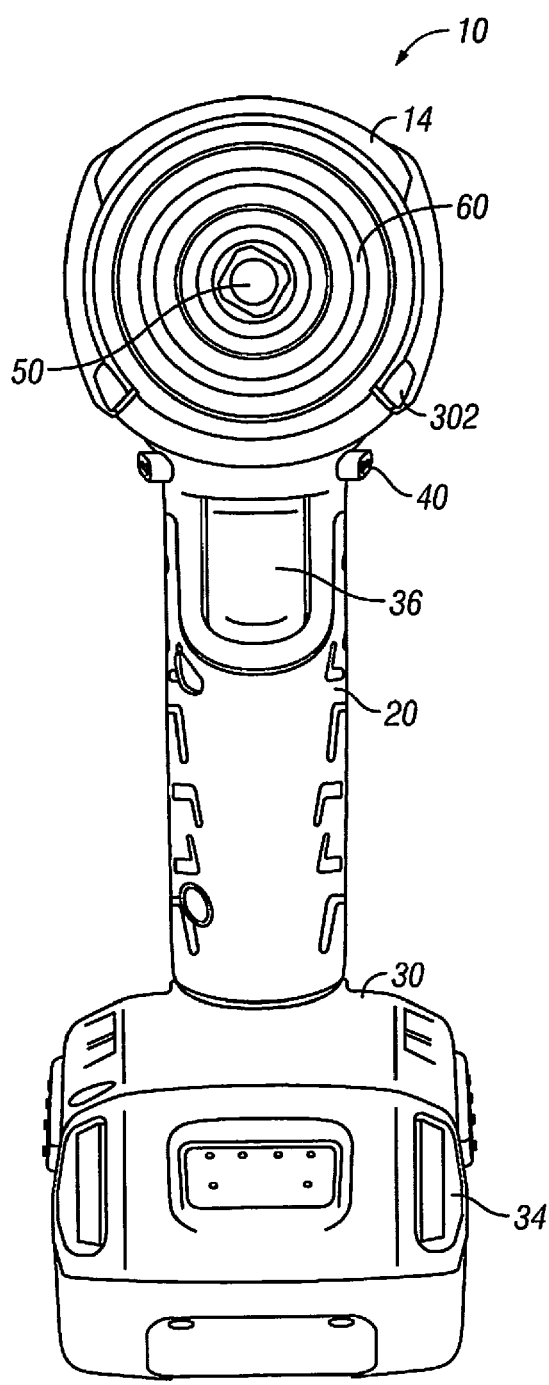
FIG. 3 is a front elevation view of the power tool of FIG. 1.

FIGS. 1-5 illustrate one embodiment of a power tool 10. More particularly and as shown in FIGS. 1 and 2, an impact tool 10, that includes a housing 12 and a hammer case 14. Housing 12 includes a motive source such an electric motor, air, or other fluid-powered motor. Impact tool 10 may further include a motor housing 15, a handle 20, and a power source housing 30, among other components. Motor housing 15 encloses a motor 38 (See FIG. 5) configured to provide a motive force and a gear assembly 70 (See FIG. 5) configured to translate the motive force from the motor 38 to an output spindle 50 of the power tool 10. In the illustrative embodiment, handle 20 extends between the motor housing 15 and the power source housing 30 and is configured to be graspable by a user of the power tool 10. Power source housing 30 is coupled to an end of the handle 20 opposite motor housing 15 and is configured to connect to a power source, for example, a battery 34 or a source of motive fluid, such as compressed air. In the illustrative embodiment, the power tool 10 is an electric impact tool, which is powered by battery 34 removably coupled to the power source housing 30. In the illustrative embodiment, the motor is an electric motor, more particularly a brushless direct-current (DC) motor.

In the illustrative embodiment, the power tool 10 also includes a controller 70 (See FIG. 5) supported in housing 12, connected to the power source, and configured to manage a plurality of processes associated with the operation of the power tool 10. In some embodiments, the controller includes a processor, memory, an input/output subsystem, and other components as might be necessary to perform the functions disclosed herein. Controller 70 may be embodied as any type of electronics capable of implementing digital logic. The memory may be configured as a read-only memory (ROM), a random access memory (RAM), a flash memory, or an electronically-erasable programmable ROM (EEPROM).

Housing 12 includes a number of user-selectable input devices (e.g., triggers, switches, and knobs) configured to allow the user to adjust one or more user selectable features of the power tool 10. For instance, housing 12 includes a trigger 36 positioned on handle 20 near motor housing 15, such that trigger 36 may be operated by a user grasping handle 20 of the power tool 10. In many power tools, the primary function of trigger 36 is to control the supply of power to the motor and, hence, the motive force delivered by motor 38 to output spindle 50. Trigger 36 is spring loaded and will default to keeping the power tool 10 powered off. As the user pulls trigger 36, power is supplied from the power source to motor 38 causing motor 38 to rotate. In some embodiments, trigger 36 includes many (including infinite) positions, such that the more trigger 36 is depressed, the more power is supplied to motor 38 and the faster a rotor 39 (See, e.g., FIG. 18) of the motor rotates.

For example, in a normal operation mode of the power tool 10, if trigger 36 is fully depressed by the user, motor 38 will cause output spindle 50 to rotate with full power. In another example, in a normal operation mode, if trigger 36 is only partially depressed by the user, motor 38 will supply less than full power to output spindle 50. In illustrative embodiment described below, trigger 36 may also be used to control other features of the power tool 10, such as the operation of lighting unit 60 of the power tool 10. For example, depressing trigger 36 may turn on lighting unit 60 of the power tool 10 and supply power to motor 38 causing motor 38 to turn and produce a motive force. In some embodiments, if trigger 36 is only partially depressed lighting unit 60 of the power tool 10 will turn on, but motor 38 of the power tool 10 will not rotate, thereby allowing the user to illuminate the work space of the power tool 10 before operating the power tool 10.

Housing 12 may also include a Forward/Neutral/Reverse ("F/N/R") switch 40 supported in housing 12 to be adjustable by the user of the power tool 10. In the illustrative embodiment, the F/N/R switch 40 is positioned in the handle 12 of the power tool 10 near trigger 36 and near the motor housing 15. The illustrative embodiment of the F/N/R switch 40 includes a forward position, a neutral position, and reverse position. The forward position is configured to cause motor 38 to rotate in one direction when trigger 36 is depressed, while the reverse position is configured to cause motor 38 to rotate in an opposite direction when trigger 36 is depressed. The neutral position disconnects trigger 36 from the motor, such that even if trigger 36 is depressed motor 38 will not rotate.

Figure 4:
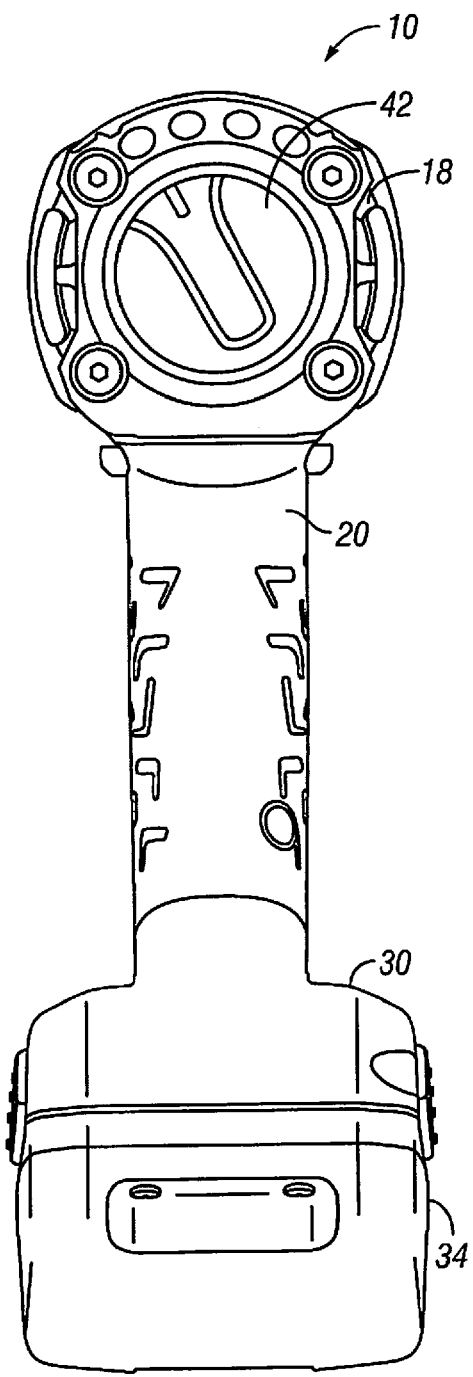
FIG. 4 is a rear elevation view of the power tool of FIG. 1.
Figure 5:
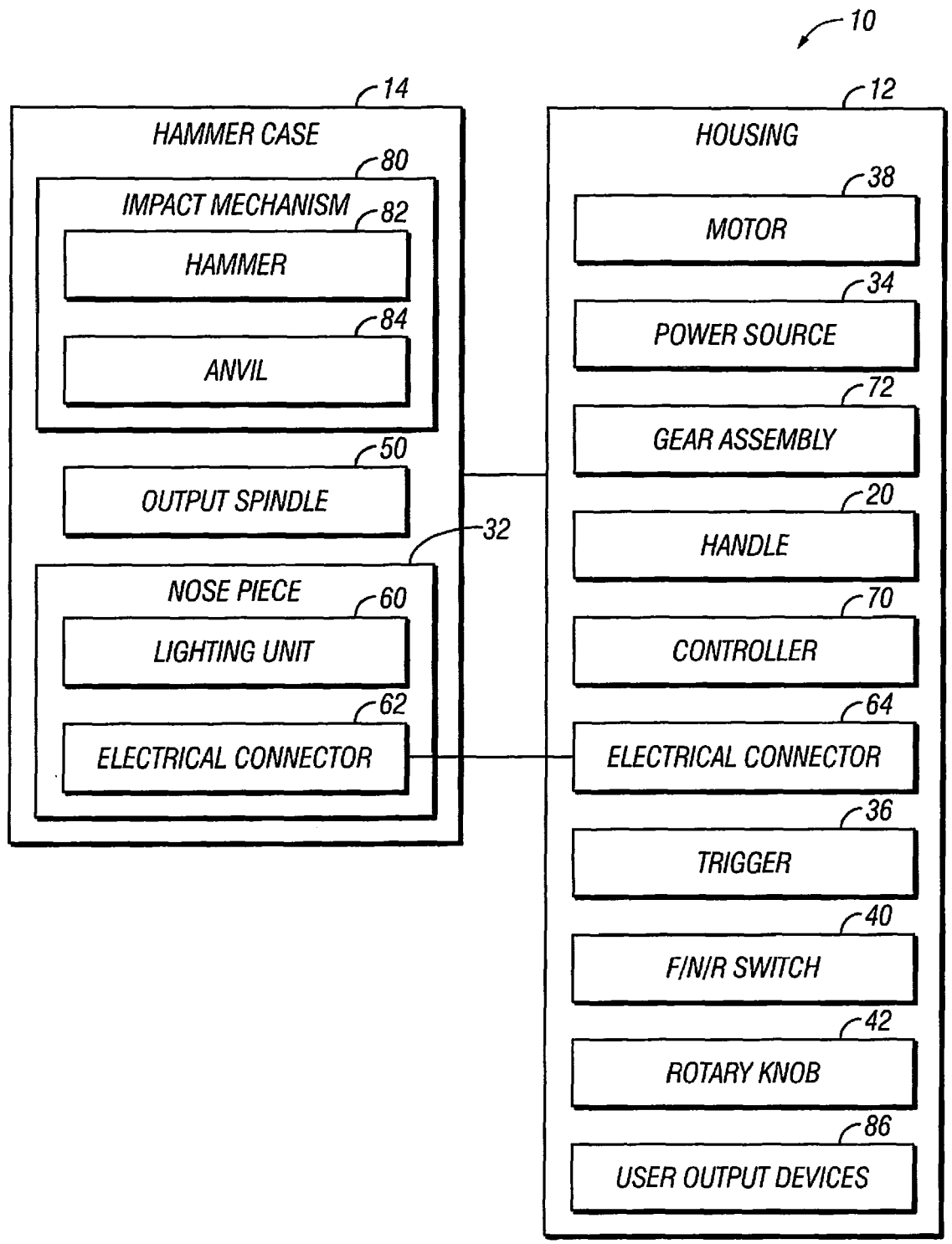
FIG. 5 is a simplified block diagram of various components of the power tool of FIG. 1.

Housing 12 also includes a rotary knob 42 positioned on a rear portion 18 of the housing 12, as shown in FIG. 4. Knob 42 faces the user during normal operation of the power tool 10. Rotary knob 42 is configured to allow the user to select one of a plurality of modes of operation of the power tool 10. When knob 42 is rotated, it passes through a plurality of detents that correspond to respective modes of operation. In some embodiments, knob 42 includes spring loaded features that engage with the respective detent features of the power tool 10. The spring loaded features on knob 42 may be "leaf spring" type features that are integral to the knob 42 or may be a plurality of components to create a spring loaded feature set (e.g., a sliding plunger preloaded by a coil spring). The tool housing has a plurality of grooves to accept the spring loaded features on knob 42 to create the necessary detents that correspond to rotary positions of the knob. In another embodiment, the detent grooves may be incorporated into the rear surface of an electric motor which is adjacent to knob 42. In yet another embodiment, the spring loaded features may be integrated into the tool housing or the rear surface of motor 38, and the detent grooves may be integrated into knob 42. In the illustrative embodiment, each detented rotary position of knob 42 corresponds to a respective operational mode of the power tool 10.

The power tool 10 may include user output devices, such as indicator lights, to indicate the operational parameters of the power tool 10. In some embodiments, chip-on-board (COB) light emitting diodes (LEDs) are used as indicator lights to provide feedback to the user about the operating conditions of the power tool 100. The feedback provided by such indicator lights may include a battery charge level, an operational mode selected, a reminder to perform maintenance, a fault indication, or an indication of completion of fastening. The COB LEDs may also provide non-functional aesthetic lighting in the power tool 100. The COB LEDs may light up in different colors and/or may blink/flash in different patterns to convey various messages to the user. In some embodiments, the user output device is a COB LEDs configured to display the battery charge level as a "bar graph." Additionally or alternatively, the user output devices of the power tool 100 may be embodied as any type of audio outputs, visual outputs (e.g., lights or various screens), and/or tactile outputs, by way of example.

In the illustrative embodiment, the hammer case 14 supports an impact mechanism 80 and output spindle 50. (See FIGS. 1, 5, and 18.) Output spindle 50 is configured to couple to any number of work attachments. As will be described in further detail below, hammer case 14 includes a removable nose piece 32, which supports lighting unit 60 and includes a nose piece electrical connector 62 that is configured to mate with a corresponding electrical connector 64 in the housing. It should be noted that, while the illustrative embodiment shows nose piece 32 supporting an LED, nose piece 32 may additionally or alternatively support other electrical accessories, such as sensors or human machine interfaces, by way of example. The electrical connector 64 in the housing is connected to battery 34 and controller 70 of the power tool 10 and is configured to provide power and/or control signals to any electrical accessories supported by nose piece 32 of hammer case 14, such as lighting unit 60.

The impact mechanism 80 of the power tool 10 may be any type of impact mechanism, such as a ball-and-cam impact mechanism (sometimes called a "Potts" mechanism) or a Maurer mechanism. In general, the impact mechanism includes an anvil 84 (See FIG. 5) coupled to (or integrally formed with) output spindle 50 and configured to rotate about an output axis 66 and a hammer 82 coupled to the output of motor 38 and configured to rotate in response to rotation of the motor 38. Hammer 82 includes one or more jaws that are configured to strike anvil 84, and thereby cause the anvil 84 and output spindle 50 to rotate.

The illustrated anvil 84 and output spindle 50 are formed as a single unitary, monolithic component. One end of this component extends outside hammer case 14 and functions as output spindle 50. Another end of this component extends inside hammer case 14 and functions as anvil 84 of impact mechanism 80. For instance, the second end of this component may be formed with two jaws to create anvil 84. The jaws of hammer 82 are configured to impact anvil 84 to functionally drive output spindle 50 in response to rotation of motor 38. The term "functionally drive" is herein defined as a relationship in which the jaws of the hammer 82 rotate to impact the respective jaws of anvil 84 and, thereby, cause intermittent rotation of output spindle 50. In some embodiments, the impact cycle is repeated twice every rotation of motor 38.

Removable nose piece 32 is positioned to couple to an output end of hammer case 14 of the power tool 10. In the illustrative embodiment, nose piece 32 includes lighting unit 60 and nose piece electrical connector 62 and is configured to keep the mating electrical connectors from inadvertently disconnecting.

As noted above, the hammer case 14 may include at least one lighting unit 60. In the illustrative embodiment, lighting unit 60 on the hammer case 14 is a headlight configured to illuminate the work space of the power tool 10. In the illustrative embodiment, the headlight is positioned in nose piece 32 of the hammer case 14 such that it surrounds output spindle 50 and is configured to shine light along output axis 66, defined by output spindle 50, and illuminate a work space of the power tool 10. Lighting unit 60 includes one or more lights installed in the hammer case 14, a protective clear lens 61 configured to prevent damage and contamination to the lights caused by foreign debris, and electrical circuitry to provide power and control signals to the headlight. In the preferred embodiment, the one or more lights are COB LEDs formed as an annular ring that surrounds the output spindle and illuminates the work space of the power tool 10. In another embodiment, the one or more lights are two or more COB LEDs formed as arcs that cooperate to surround output spindle 50.

To date, the LEDs employed on power tools have typically been either "through hole" or "surface mounted" LEDs. The use of one or more COB LEDs as a headlight provides several advantages over these commonly used types of LEDs. In general, COB LEDs are more effective as a floodlight than previous "through hole" or "surface mounted" LEDs. The use of COB LEDs on a power tool provides greater light output (lumens) in a smaller package size, and COB LEDs also create a more consistent light beam than previous light emitting sources used on power tools. Another advantage of COB LEDs is that they can be shaped to match any profile of a tool. This allows COB LEDs to produce a continuous beam of light that is positioned to maximize the light delivered to the work space of the power tool.

Lighting unit 60 of the power tool 10 may be powered by any number or type of power supplies. In the illustrative embodiment, the lighting unit is powered directly from battery 34 or through a constant current source which in turn draws its power from battery 34 removably coupled to the power tool 10. In a corded electric tool embodiment, the lighting unit may instead be powered by a constant current source which in turn draws its power from a line voltage. In a pneumatic tool embodiment, it may be powered by a constant current source that draws its power from an onboard battery of the power tool 10.

As noted above, in the illustrative embodiment, the lighting unit 60 comprises COB LEDs that are used as a "headlight" to illuminate the work space of the power tool 10. The lighting unit may be mounted near output spindle 50 of power tool 10 and may be configured to be in any shape and size which best suits illuminating the work space of the power tool 10. For example, in a pistol grip impact tool 10 (as shown in FIGS. 1-5), output spindle 50 may protrude through a hole in the center of the COB LED headlight. In some embodiments, the COB LED headlight may have other shapes, such as a "U" shape that wraps around output spindle 50 of the power tool 10. In yet other embodiments, there may be other shapes and sizes which would be more desirable in specific applications, including certain embodiments where the COB LEDs are contoured to the shape of the power tool 10. Alternatively, lighting unit 60 may include various patterns or arrangements of the diodes of the COB LEDs that optimize the illumination for specific applications. The COB LEDs may be mounted to the power tool 10 via adhesives, tape, threaded fasteners or integrated clip features with corresponding mating components. Lighting unit 60 may include a protective clear lens 61 to prevent damage and contamination by foreign debris to the lights of the power tool 10. Protective clear lens 61 may be connected to lighting unit 60 or hammer case 14 via integrated threads, separate threaded fasteners or integrated clip features. The wires running from the power source to the lighting unit may be routed inside the tool housing and the hammer case.

As will be discussed in more detail below, in some embodiments, lighting unit 60 turns on whenever power is supplied to the motor of the power tool 10, for example, when the user depresses trigger 36 of the power tool 10. In some embodiments, controller 70 may cause lighting unit 60 to flash various patterns, or emit certain colors of light, or both, to indicate certain events to the user of the power tool 10, such as, for example, completion of fastening operation, faults/errors, maintenance reminders, or other operational conditions of the power tool 10.

In some embodiments, an additional lighting unit may be positioned on the power tool 10 (either on hammer case 14 or on housing 12) and used as an indicator to provide feedback to the user. This additional lighting unit may also include one or more COB LEDs to provide illumination for visual indicators. For example, COB LEDs may be used to indicate the battery charge level. When the battery is at full charge, all diodes on the board are illuminated. As the battery discharges, diodes of the COB LEDs are switched off creating a "sliding scale" indicator. Alternatively, or in conjunction, diodes of different colors may be switched on or off to indicate different battery charge levels. COB LEDs used as visual indicators may be configured to be any of size or shape, such as, for example, a rectangular bar, an arc, a trapezoid or a triangle. In another embodiment, the additional lighting unit may be configured to convey information to the user about various operational conditions of the power tool 10, such as the speed of rotation of various parts of the power tool 10, the torque applied by the power tool 10 to a fastener, the temperature of the power tool 100, the operational mode setting of the power tool 10, and/or a timer countdown.

In some embodiments, an additional lighting unit may be used for aesthetic lighting. For example, COB LEDs may be mounted to the exterior of the power tool 10 or the interior of the housing in such a manner that the light inside is visible through vents or other holes in the housing. In the aesthetic lighting context, the brightness, color of emitted light, and pattern of lighting changes may be controlled by inputs from the user.

Nose piece 32 of hammer case 14 also includes nose piece electrical connector 62 that is configured to mate with a corresponding electrical connector 62 (See FIG. 7) in the housing and provide energy from the power source to electrical components supported in the hammer case 14, such as, for example the lighting unit(s). In general, electric power tools, whether corded or cordless, utilize a plurality of wires on the inside of the tool to connect electrical components. Often, electrical wires that are routed through tight areas of the tool between the components of the tool can complicate assembly of the tool and the serviceability of the tool. For example, wires that are routed between hammer case 14 and housing 12 of the power tool 10 must be connected before hammer case 14 is fully installed and must be disconnected before the hammer case can be fully removed from tool housing 12. This adds an extra step to when assembling and disassembling the power tool 10 (e.g., during maintenance) and risks damage to the wires and/or the connector.

Figure 9:
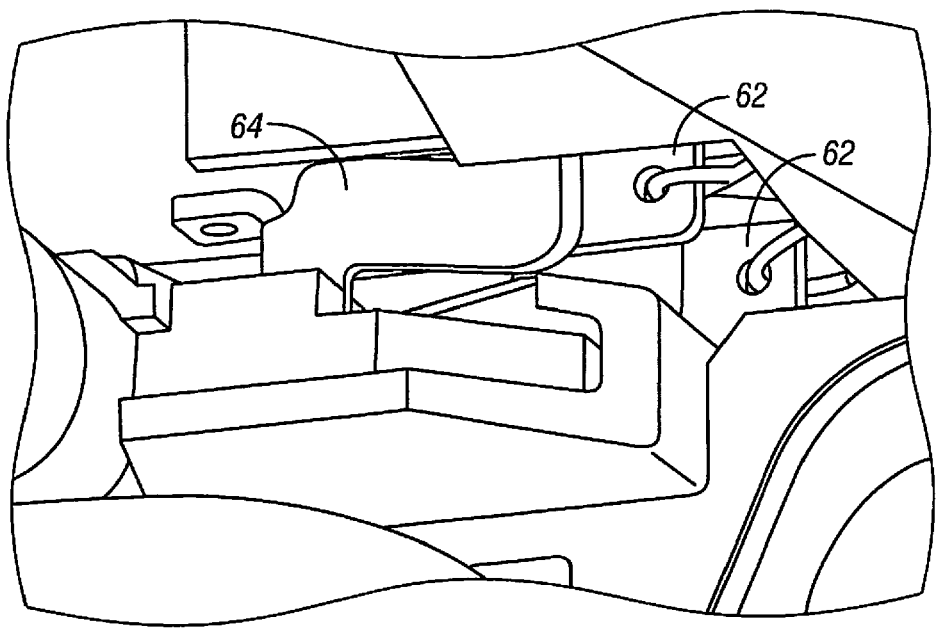
Figure 10:
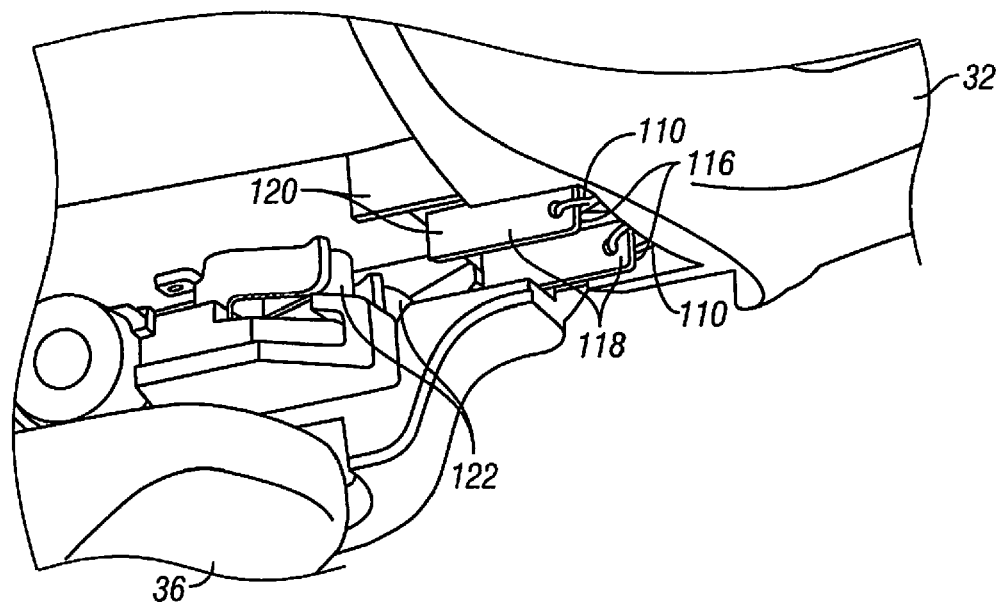
Figure 11:
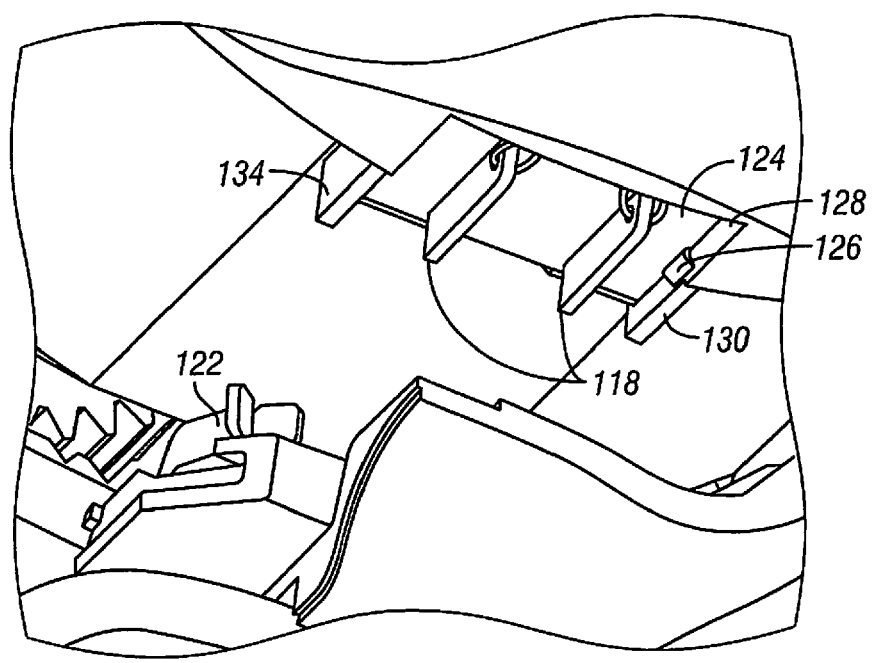
Figure 12:
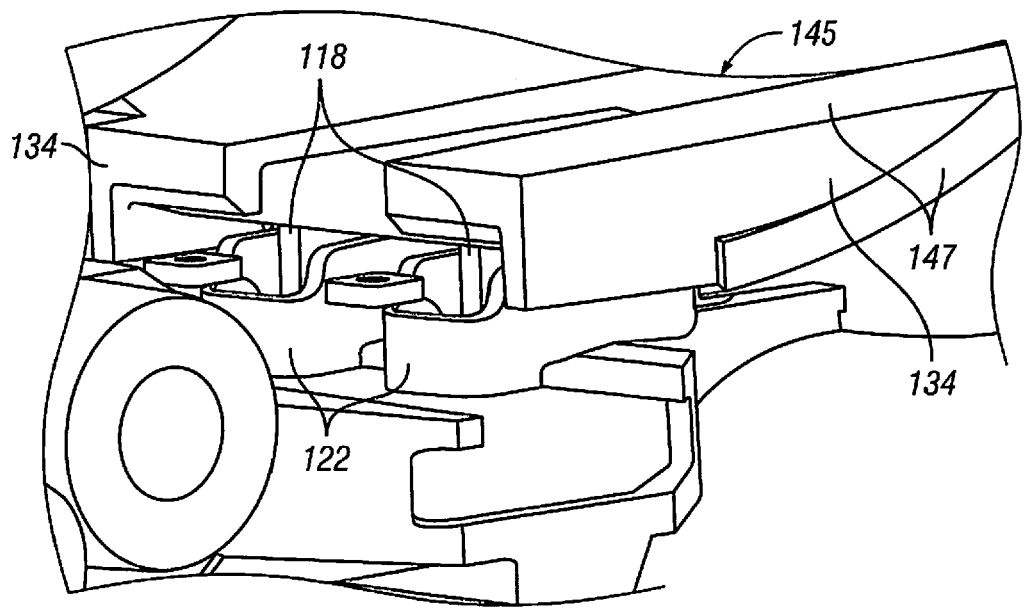
Figure 13:
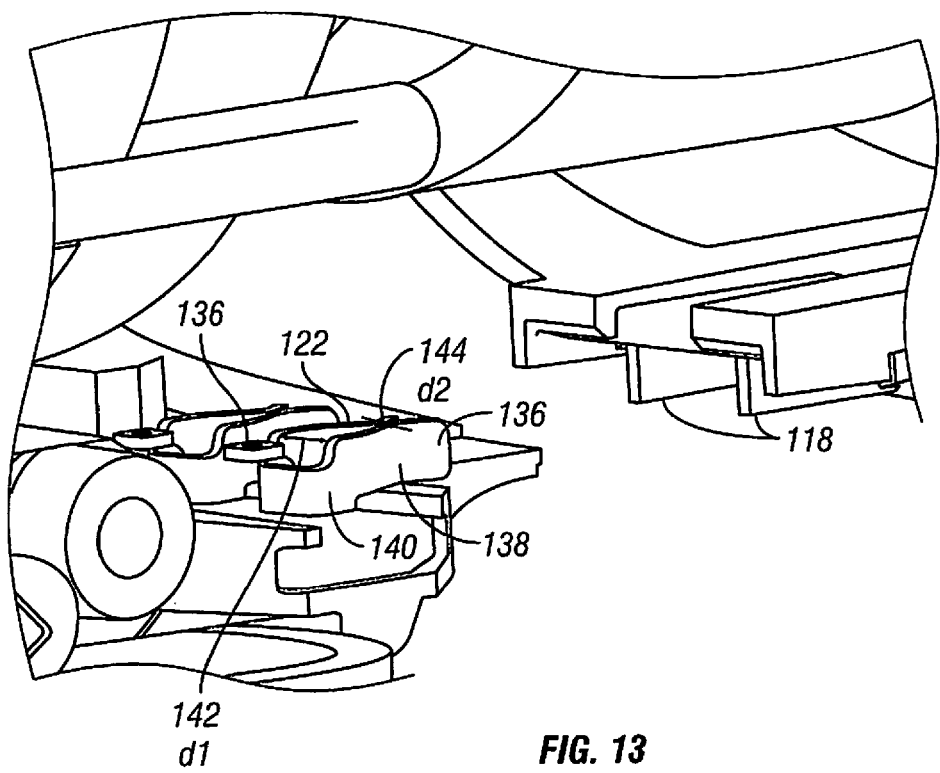

In the illustrative embodiment, nose piece electrical connector 62 includes two male terminals 118 configured to mate with two corresponding female terminals 122 of electrical connector 64 in housing 12 of power tool 10. (See FIGS. 9, 10, 11.) When hammer case 14 is installed, connectors 62 and 64 mate with one another creating the necessary electrical connection and providing power and control signals to the electrical components of hammer case 14, such as lighting unit 60. Hammer case 14 is secured to the housing with a plurality of fasteners, which in turn keeps the electrical connectors from separating from one another while the power tool 10 is assembled.

By using mating electrical connectors 118 and 122 fixed onto two respective mating mechanical components, the risk of damage from making or breaking the electrical connections by hand when assembling or disassembling the power tool 10 is mitigated. In the illustrative embodiment, lighting unit 60 mounted to the front face of the hammer case 14 is supplied with electrical power by the plurality of wires 110 that are routed through housing 12 and the pair of electrical connectors 118 and 122. In the illustrative embodiment, one or more lengths of wire 110 connect lighting unit 60 to nose piece electrical connector 62 and one or more lengths of wire connect the electrical components of housing 12 (e.g., the battery and the controller) to the housing electrical connector 64. When hammer case 14 is installed on the power tool 10, the two electrical connectors 62 and 64 mate with one another creating an electrical connection between the electrical components in hammer case 14 and the electrical components in housing 12. Hammer case 14 is mechanically secured to housing 12 with a plurality of threaded fasteners, which mechanical connection also serves to keep the mating electrical connectors from inadvertently disconnecting.

Figure 6:
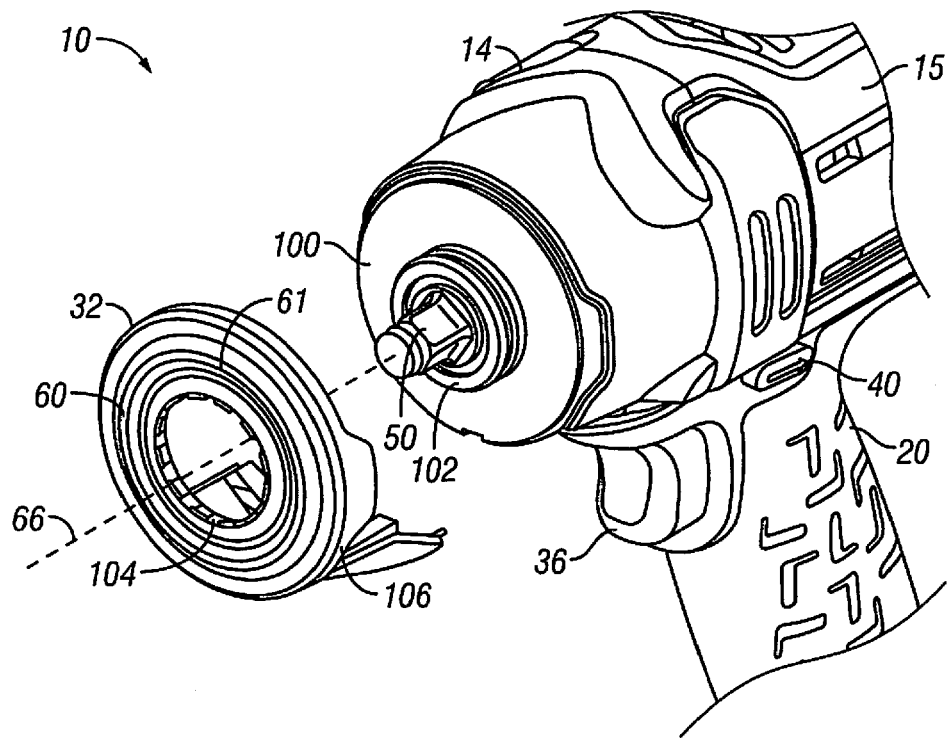
FIGS. 6 and 7 are exploded perspective views showing a nose piece of the power tool of FIG. 1.
Figure 7:
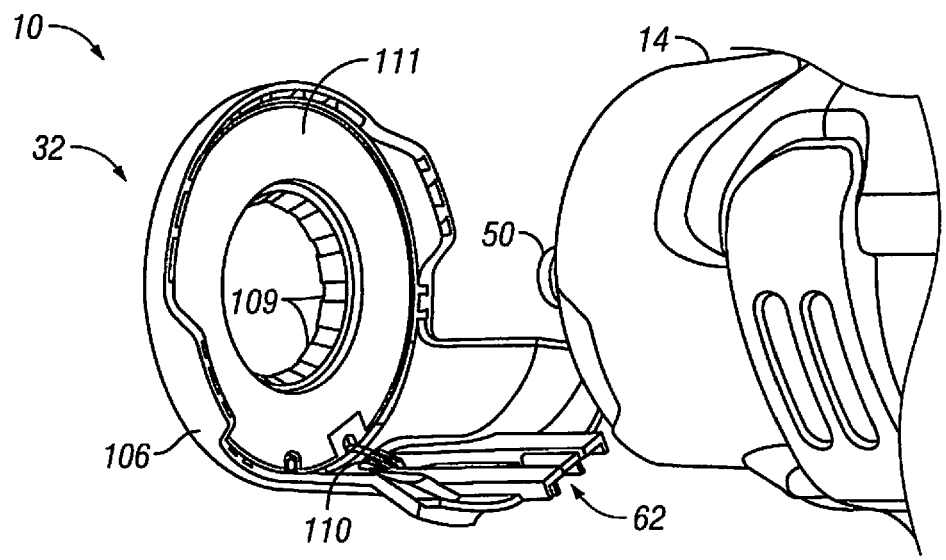
Figure 8:
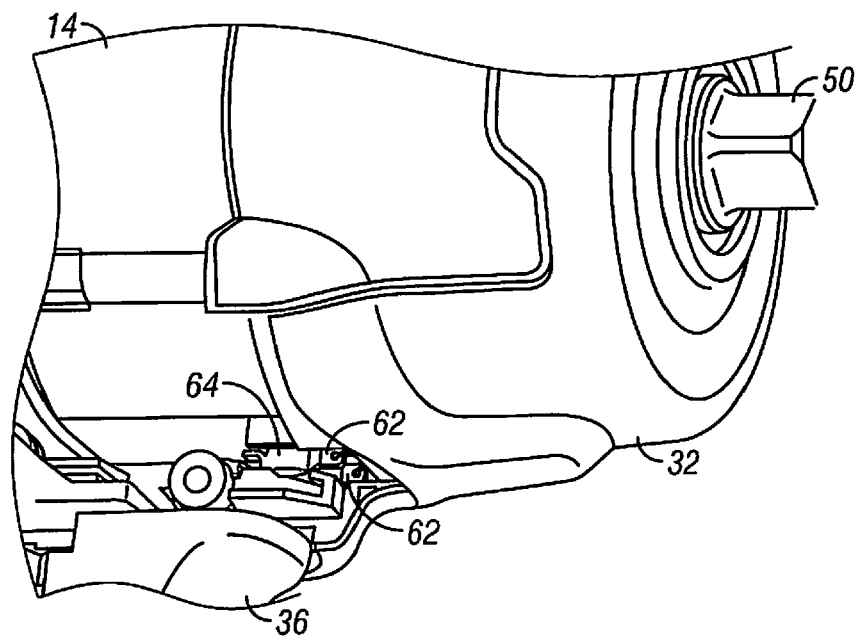
FIGS. 8, 9, 10, 11, 12, 13, 14, and 15 are various perspective views of electrical connectors of the power tool of FIG. 1.

Referring to FIGS. 6 and 7, nose piece 32 is shown exploded from hammer case 14. Nose piece 32 includes a nose frame 111, a lighting unit 60, a lens 61, an electrical connector 62, electrical wiring 110 and overmolding 106. Nose piece 32 defines an aperture 104 configured to allow output spindle 50 to pass through. As will be discussed in more detail below, output end 100 of hammer case 14 includes an annular flange 102 surrounding output spindle 50 that is configured to engage one or more retaining clips 109 built into aperture 104 of nose piece 32.

Referring to FIGS. 8-15, nose piece electrical connection 62 and housing electrical connection 64 of power tool 10 are shown. In the illustrative embodiment, the nose piece electrical connection 62 includes two male terminals and housing electrical connection 64 includes two female terminals configured to receive the two male terminals. The two connectors form a blade and socket pair, where housing 12 includes sockets 122 (See e.g., FIG. 15) and nose piece 32 includes blades 118. The male terminals of the hammer case are flat, rigid blades made of a conductive metal (e.g., copper). The female terminals of the housing include flexible beams 140 made of a conductive metal (e.g., copper) that are configured to provide the necessary normal force on the rigid blades to form an electrical connection. As can be seen in FIGS. 8-15, the female terminals 122 of housing 12 are generally "U"-shaped receptacles. The male connectors 118 are coupled to the female connectors 122 by an interference fit, where an electrical connection between the connectors is maintained by the two flexible beams 140 of each female terminal applying a pinching force on each blade 118 of the corresponding male terminal.

Figure 14:
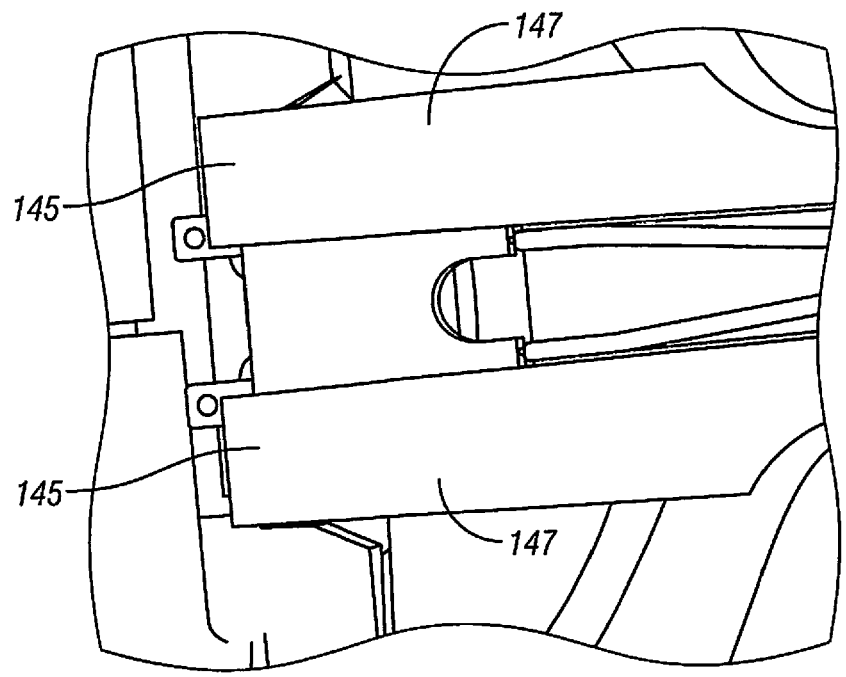
Figure 15:
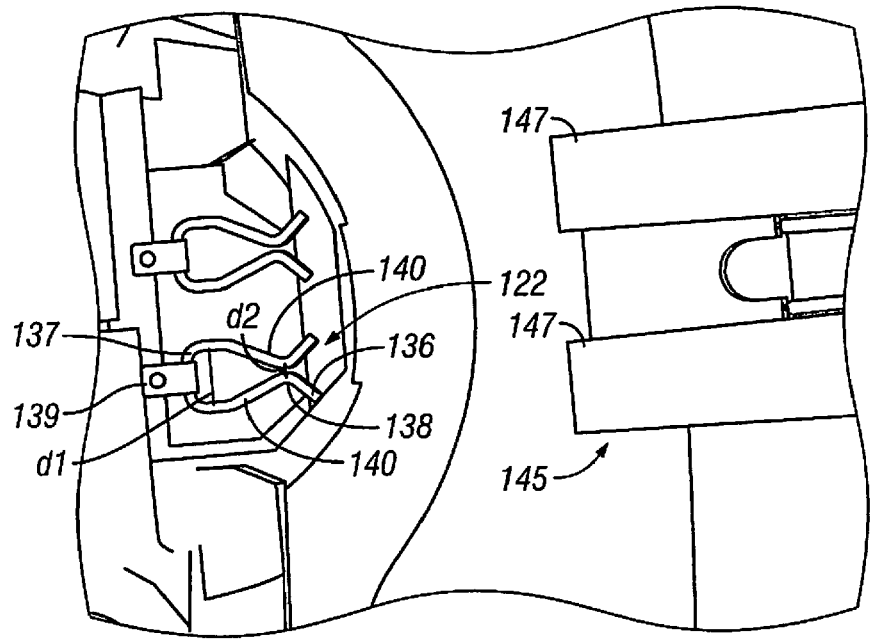

In the illustrative embodiment, nose piece electrical connectors 62 are positioned on removable nose piece 32 of hammer case 14 and housing electrical connectors 64 are positioned in a corresponding location in housing 12 near trigger 36. Nose piece 32 includes piloting features 145, as shown in FIG. 14, configured to protect the electrical connectors 118, guiding nose piece electrical connectors 62 to mate with the corresponding housing electrical connectors 64, and secure nose piece 32 to housing 12. Piloting features 145 include two sidewalls 134 extending parallel to the male terminals 118 and a top wall 147. An inner surface of each sidewall 134 includes a flange 126 configured to interface with a corresponding structure on housing 12 and secure nose 32 piece to housing 12. (See FIG. 11.)

The male terminals 118 of nose piece electrical connector 62 include a blade extending from a leading end to a wired end. The leading end of the blade is oriented to face away from the nose piece and interact with the female terminal 122. The wired ends of the male terminals 118 is oriented toward nose piece 32 and is configured to connect to the wiring of the hammer case.

The female terminals 122 of housing connector include two flexible beams 140. (See FIG. 15.) Each flexible beam 140 extends from a first end of the female terminal to a second end of the female terminal and forms a slot to receive the blade 118 of the corresponding male terminal. The first end of the female terminal is oriented to be facing the tool housing and includes a base 137 that includes wire connectors 139 configured to connect to the wires of housing 12. The two flexible beams extend from base 137 and form a pincer 138 near the second end of the female terminal. Flexible beams 140 are angled such that at the first end of the female terminal the flexible beams are separated by a first distance 142, and at pincer 138 near the second end of the female terminal the flexible beams are separated by a second distance 144, which is less than first distance 142. In the illustrative embodiment, the flexible beams 140 approximately touch at pincer 138. After pincer 138 of the female terminal, the flexible beams flare 132 outward. Flare 132 of the flexible beams 140 is configured to guide blades 118 of the nose piece electrical connector 62 into the slot defined by the flexible beams 140.

Nose piece 32 is advanced onto power tool 10, leading end 120 of each blade of each male terminal 118 contacts flare 136 of flexible beams 140 of corresponding female terminal 122. Flare 132 of flexible beams 140 guides blade 118 of the male terminal to pincer 138. (See FIGS. 10, 11, 12, 13, and 15.) The advancing of the blade 118 of each male terminal pushes flexible beams 140 outward, such that the distance between flexible beams 140 at the pincer 138 is greater than the second distance 144, thereby allowing each blade to advance into a slot defined by the flexible beams 140 of each corresponding female terminal 122. Flexible beams 140 of each female connector 122 are configured to apply a force on each blade 118 at the pincer 138, thereby establishing an electrical connection between the two electrical connectors.

When the power tool 10 is disassembled, nose piece 32 is advanced in the opposite direction away from housing 12 of the power tool 10, blades 118 of the male terminals are advanced out of female terminals 122 breaking the electrical connection. After blades 118 are removed from female terminals 122, the distance between the flexible blades of each female terminal at pincer 138 is approximately the second distance 144.

While an illustrative embodiment of electrical connector pairs has been described above, it is also contemplated that the electrical connectors may be embodied as many other types of electrical connector pairs in different embodiments. Such types of electrical connector pairs may include a "pogo pin" terminals that mate with copper pads on a printed circuit board (PCB), metal balls soldered to via holes in a PCB that mate to bare via holes on another PCB, "leaf spring" contacts that mate to copper pads on a PCB, wireless inductive coupling, fiber optic connectors. In some embodiments, housing electrical connectors 64 may include the male terminals, and the nose piece electrical connectors may include the female terminals. It will be appreciated that the electrical connector pair may be used to provide power to the electrical motor, electrostatic discharge protection, provide power to a display screen, or provide an electrical connection for sensors, such as, for example, transducers, encoders, ultrasonic transceivers, laser/optical transceivers, proximity sensors, and/or radio frequency identification (RFID) transceivers supported in or by the hammer case.

In some embodiments, an ultrasonic transceiver supported by hammer case 14 may be used to inspect the fastener for defects or cracks. In some embodiments, optical transceivers supported by the hammer case may be used to measure the proximity of the power tool 10 to the other objects. In some embodiments, an RFID transceiver supported in hammer case 14 may identify the attachment that is installed on output spindle 50, allowing the motor controller to adjust the operation mode of the power tool 10 to suit the attachment. For example, an impact wrench may be able to recognize that a torque stick has been installed and reduce motor 38 speed to allow the mechanism to operate less erratically. In some embodiments, optical transceivers supported by hammer case 14 can be used for process control. For example, the optical transceivers may identify how many fasteners need to be tightened and determine when the operator has used the power tool 10 on each identified fastener. In some embodiments, hammer case 14 can be removed from the power tool 10 and the tool housing electrical connection may be configured to serve as a diagnostic port that interfaces with an external computing device. In some embodiments, the power tool 10 may include a variety of removable and interchangeable nose pieces, with each removable nose piece having different features, such as different colors of LED headlights or different configurations/shapes of the headlight. In some embodiments, hammer case 14 may include a lock-out or dongle device that disables the power tool 10 to deter theft of the tool or to enhance safety when repairing or servicing the tool.

Figure 16:
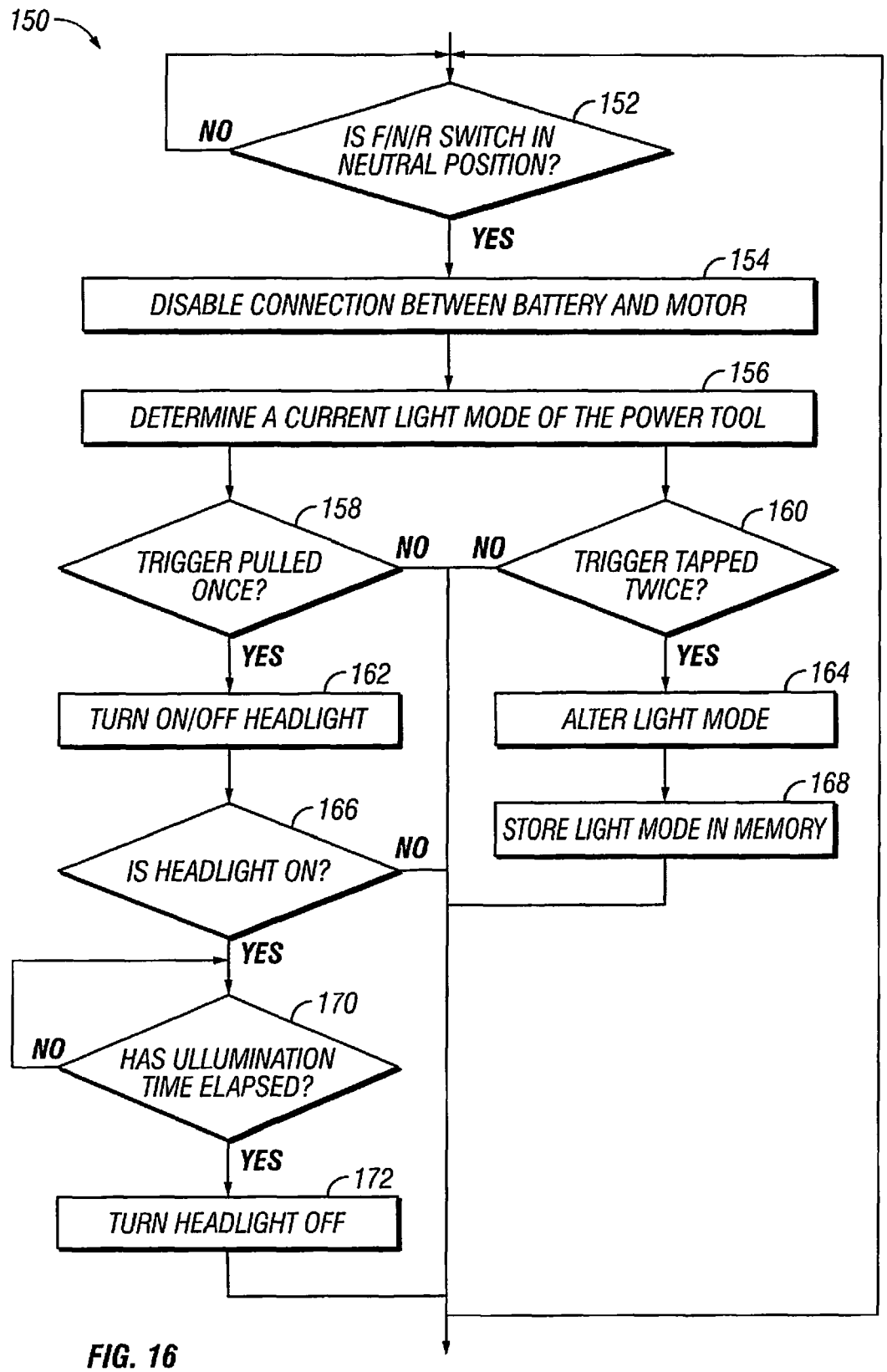
FIG. 16 is a simplified flow chart of one illustrative embodiment of a headlight control process that may be performed by the power tool of FIG. 1.

Referring now to FIG. 16, one illustrative method of using the trigger of the power tool 10 to provide additional user interface capabilities (beyond controlling the speed of the motor) is shown as flow chart 150. In the illustrative embodiment, the method controls the light output of lighting unit 60 of power tool 10. The different light output modes may include changes in brightness of the light, the pattern of the light (e.g., flashing or blinking), the color of the light produced by the lighting unit, and/or the amount of time light is emitted from the lighting unit.

In general, as lighting technology has progressed, the headlights on power tools have become increasingly brighter. In some situations, the user may desire to dim the light output or to turn off the light entirely while operating the power tool 10. In some embodiments, the power tool 10 includes an additional switch to allow the user to alter the light output of lighting unit 60.

In the illustrative embodiment, the light output of lighting unit 60 is controlled by trigger 36 of the power tool 10. When the F/N/R switch 40 is in the neutral position 152 the rotor of the motor of the power tool 10 will not rotate when the trigger is pulled as indicated at 154. In the illustrative embodiment, a mechanical lock and the controller cooperate to prevent the motor from rotating while the F/N/R switch 40 is in the neutral position. In particular, a mechanical lock engages trigger 36 and allows trigger 36 to be pulled far enough to close the electrical circuit that powers up controller 70, but not far enough to close the electrical circuit that powers up motor 38. Additionally, while the F/N/R switch 40 is in the neutral position, controller 70 is configured to prevent motor 38 from being powered. In some embodiments, while F/N/R switch 40 is in the neutral position, controller 70 is configured to latch a circuit when the trigger is pulled that keeps electrical power supplied to the controller for a period of time after the trigger is released.

As shown in FIG. 16, the method begins with the controller determining if F/N/R switch 40 is in the neutral position AT 152. If F/N/R switch 40 is not in the neutral position and trigger 36 is depressed by the user, motor 38 rotates in the direction indicated by F/N/R switch 40. In the illustrative embodiment, controller 70 will activate the desired headlight output setting when trigger 36 is depressed and F/N/R switch 40 is in the forward position or the reverse position. If controller 70 determines that F/N/R switch 40 is in the neutral position, controller 70 disables the electrical connection between battery 34 and motor 38, such that motor 38 cannot receive power. Controller 70 also determines what light output mode light unit 60 of the power tool 10 is currently using to emit light. In the illustrative embodiment, the current light output mode of the power tool 10 is stored in the memory of controller 70.

A light output mode may include any of a combination of brightness characteristics, color characteristics, pattern characteristics, or timing characteristics that the controller uses to determine how the headlight should emit light. For example, light output modes may include emitting light at full brightness, emitting light at 66% brightness, emitting light at 33% brightness, emitting no light, emitting light in any of a variety of colors, emitting light in a flashing or blinking pattern, emitting light for certain amounts of time, and/or emitting light using any combination of the previously discussed features of brightness, color, pattern, and/or time.

In the illustrative embodiment, controller 70 is configured to allow the user to control light unit 60 of the power tool 10 by pulling trigger 36 while F/N/R switch 40 is in the neutral position. In the illustrative embodiment, if trigger 36 is pulled once as indicated at 158 by the user, it will cause the controller to turn on/off light unit 60 at 162. For example, if the user pulls trigger 36 while F/N/R switch 40 is in the neutral position and light unit 60 is already turned on as indicated at 166, then it will turn off. This allows the power tool 100 to be used as a task light without motor 38 rotating. When the power tool 10 is being used as a task light only, an illumination timer causes the headlight of the power tool 100 to turn off after a pre-determined amount of time as indicated at 170 and 172, thereby conserving the power stored in the battery of the power tool 10. In some embodiments, the illumination timer is set to turn off lighting unit 60 after ten minutes of uninterrupted use.

In the illustrative embodiment, if the trigger is pulled multiple times in quick succession in a short period of time by the user (e.g., the trigger is tapped twice within one second) as indicated at 160, the controller may toggle through various light output modes as indicated at 164. For example, if the user double-taps 160 trigger 36 while F/N/R switch 40 is in the neutral position, the light output mode may be changed from a full brightness mode to a 66% brightness mode. Controller 70 may be configured to toggle through each of the light output modes in successive order and even store the light modes in memory at 168.

Figure 17:
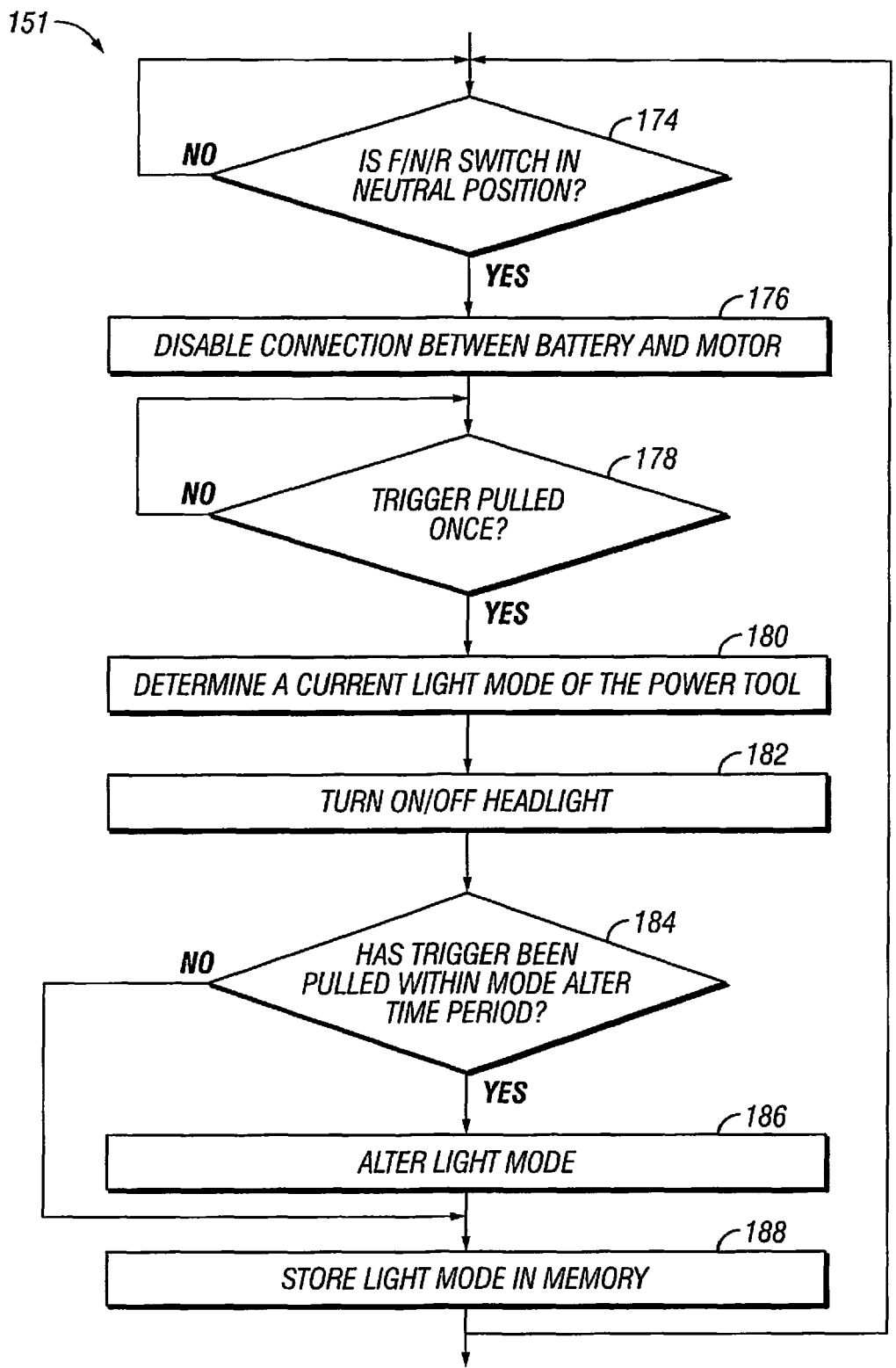
FIG. 17 is a simplified flow chart of another illustrative embodiment of a headlight control process that may be performed by the power tool of FIG. 1.

As shown in Chart 151 of FIG. 17, in another embodiment, the user may cycle between light output modes with single pulls 174 of the trigger 36. For example, when F/N/R switch 40 is in the neutral position and when a user makes single trigger pulls 174, depending on the timing of the trigger pulls, tool 10 may either act as a headlight or it can cycle through light output modes. The first pull 178 of trigger 36 when F/N/R switch 40 is in the neutral position may cause controller 70 to turn on the headlight in the current light output mode at 180- and 182. If the user wants to cycle through light output modes, the user may pull the trigger again within a predetermined time period at 184. This time period is used to determine if the user has made a final selection of a light output mode. After a trigger pull by the user, controller 70 will wait for predetermined time period. If the user pulls trigger 36 within this time period, controller 70 will cause the power tool to cycle to a different light output mode 186. If the user does not pull the trigger within the predetermined time period, controller 70 will store the selected light output mode at 188 for use during the forward and reverse operations and will continue outputting light according to the selected light output mode. After the predetermined time period has expired, if the user pulls the trigger again the controller will turn off the headlight. Lighting unit 60 may also be turned off by an illumination timer or by moving the F/N/R switch 40 to a forward or reverse position.

For both of the methods of controlling the light output mode (FIGS. 16 and 17), the light output mode selected by the user is stored in the memory of the controller to be used during the normal operation of the power tool 10. When trigger 36 is depressed and power tool 10 is turned on, controller 70 retrieves the current light output mode stored in memory and operates the headlight of the power tool 10 according the characteristics of the current light output mode. For example, if the trigger is depressed while F/N/R switch 40 is in the forward position and the current light output mode is 33% brightness, the controller will cause the headlight to turn on with 33% brightness while trigger 36 is depressed. In some embodiments, certain light output modes may be configured to allow the headlight of the power tool 10 to stay on for a certain period of time after the trigger is released. For example, if trigger 36 is depressed while F/N/R switch 40 is in the forward position and motor 38 rotates, lighting unit 60 may be configured to stay on for a few seconds after the trigger is released, thereby allowing the user to inspect the work just accomplished. In other embodiments, the headlight turns off when motor 38 stops.

It will be appreciated that, in other embodiments, other user inputs may be used to control lighting unit 60 of the power tool 10. For example, holding down trigger 36 may cause lighting unit 32 to cycle through various modes of operation and releasing trigger 36 at the moment when lighting unit 60 is operating in the desired mode or brightness may cause controller 70 to save the light output setting. In another example, actuation of trigger 36 may cause the power tool 10 to go into a light output selection mode. While in this mode, rotation of a power regulator knob 42 may allow the user to select the desired light output mode. Releasing trigger 36 or re-actuating trigger 36 may cause controller 70 to save the light output setting. In yet another example, a push/pull operation of knob 42 may control the light output settings. For instance, there may be several detents as knob 42 is moved axially which correlate to respective light output modes. In still other examples, other buttons, toggles, or sliders mounted in accessible locations adjacent to the power regulator knob may be used to control the light output modes. In another example, an optically clear capacitive touch sensor integrated into the protective lens covering the headlight may be used to control the light output settings. In such embodiments, when the user touches lens 61, controller 70 may toggle through the available light output modes.

It is also contemplated that other light output modes may be selected by the user of power tool 10. For example, one or more light output modes may adjust how long the lighting unit stays illuminated after trigger 36 is released or after the fastening operation is completed. In another example, one or more light output modes may adjust the length of time the lighting unit stays illuminated when being used in the task light mode. In another example, one or more light output modes may include the feature of having the lighting unit gradually dim instead of turning off abruptly. In another example, one or more light output modes may include a safety strobe mode of operation where the lighting unit flashes in any number of colors. The safety strobe mode may be used when performing roadside repairs with the power tool 10. In another example, one or more light output modes may include the feature of having the lighting unit flash when the power tool 10's battery charge state is low. In another example, one or more light output modes may include the feature of having the lighting unit 60 flash to indicate internal errors experienced by the power tool 10. In another example, one or more light output modes may include the ability to turn specific LEDs of the lighting unit on/off to change the beam spread of the LED.

Referring now to FIGS. 18-25, nose piece 32 includes a lens 61 and rubber overmolding 106. Overmolding 106 on the lens 61 protects the front end of power tool 10 and lens 61 from damage caused by foreign debris that is generated in the work space of the tool, for example overmolding 106 prevents lens from being scratched. Overmolding 106 also seals lighting unit 60 (e.g., the COB LED) and prevents debris from damaging the lighting unit. Overmolding 106 also covers retaining clips 109 of the nose piece. (See FIGS. 18, 19, 20, 21, and 22.) Overmolding 106 further provides structural support and dampens vibrations of the lighting unit's printed circuit board (PCB) caused by the operation of the tool. In some embodiments, the rubber overmolding 106 may be extended radially inward through the aperture to seal output spindle 50 and keep grease inside the hammer case interior of the tool and foreign debris out of the hammer case interior.

Figure 18:
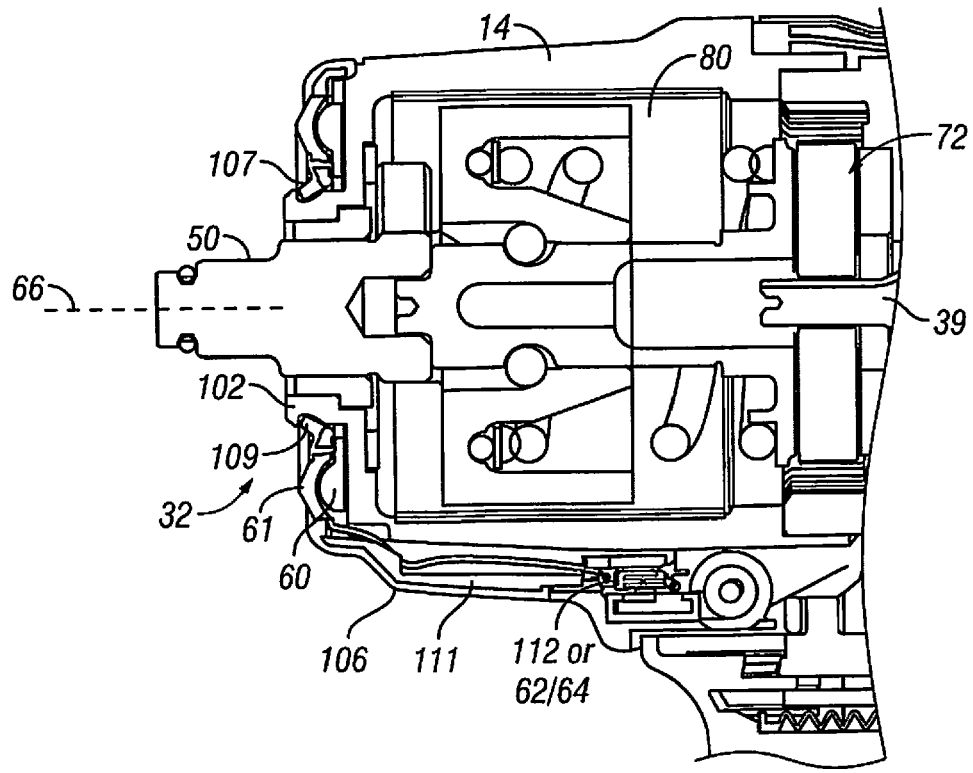
FIGS. 18 and 19 are cross-sectional side elevation views of a front end of the power tool of FIG. 1.
Figure 19:
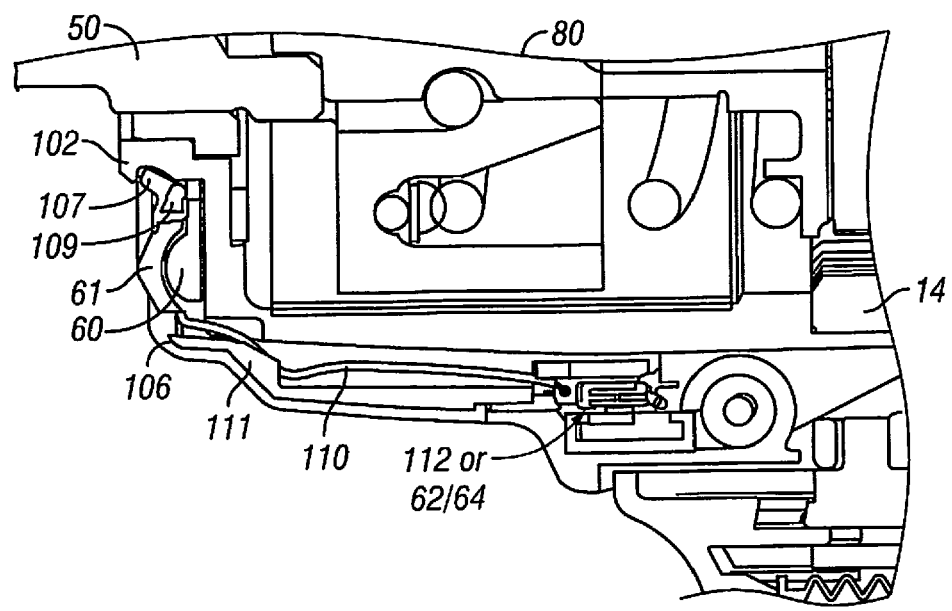

As shown in FIGS. 18 and 19, hammer case 14 of power tool 10 houses a gear assembly 72 and impact mechanism 80. Output spindle 50 extends from impact mechanism 80 to the outside of the tool through a flange aperture 104 defined by flange 102 of the hammer case. (See FIGS. 6 and 24.) As noted above, in the illustrative embodiment, output spindle 50 is formed as a monolithic piece with anvil 84 of the impact mechanism 80. In the illustrative embodiment, the gear assembly 72 is a planetary gear set with the rotor extending into the gear assembly and configured to act as the sun gear of the gear assembly. As the rotor rotates, the gear assemble rotates and causes the impact mechanism to function.

As discussed above with regard to FIGS. 6 and 7, nose piece 32 includes the nose frame 11, lighting unit 60, protective lens 61, nose piece electrical connector 62, electrical wiring 110 connecting lighting unit 60 to the electrical connector 62, and overmolding 106. (See, also, FIGS. 20 and 21.) Nose piece 32 includes an opening 113 that defines an output spindle aperture 104 configured to allow output spindle 50 to pass through. One or more retaining clips 109 are formed in the opening 113 of nose piece 32. The one or more retaining clips 109 are configured to engage with annular flange 102 of hammer case 14 that surrounds output spindle 50.

Figure 20:
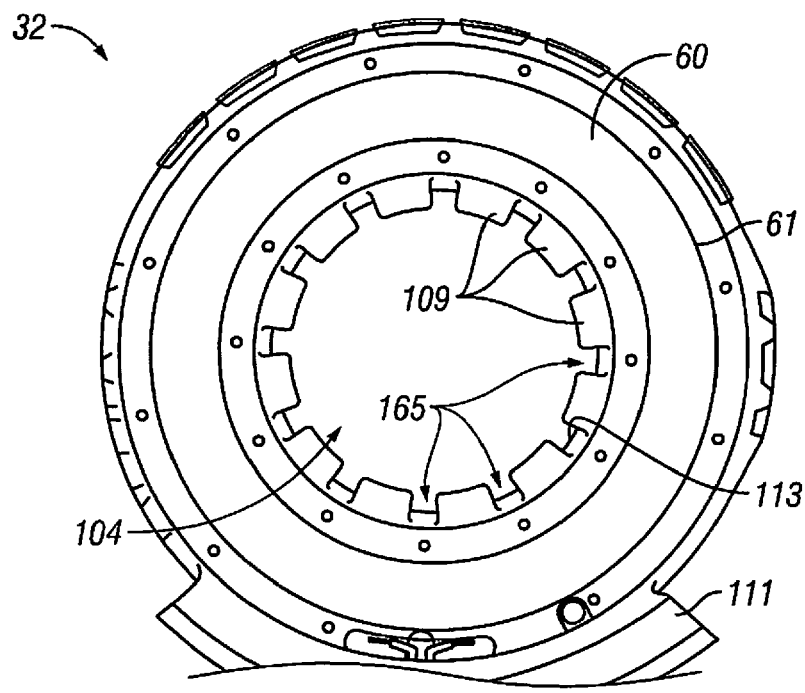
FIGS. 20, 21, 22, and 23 are front elevation views of the nose piece, both with and without overmolding.
Figure 21:
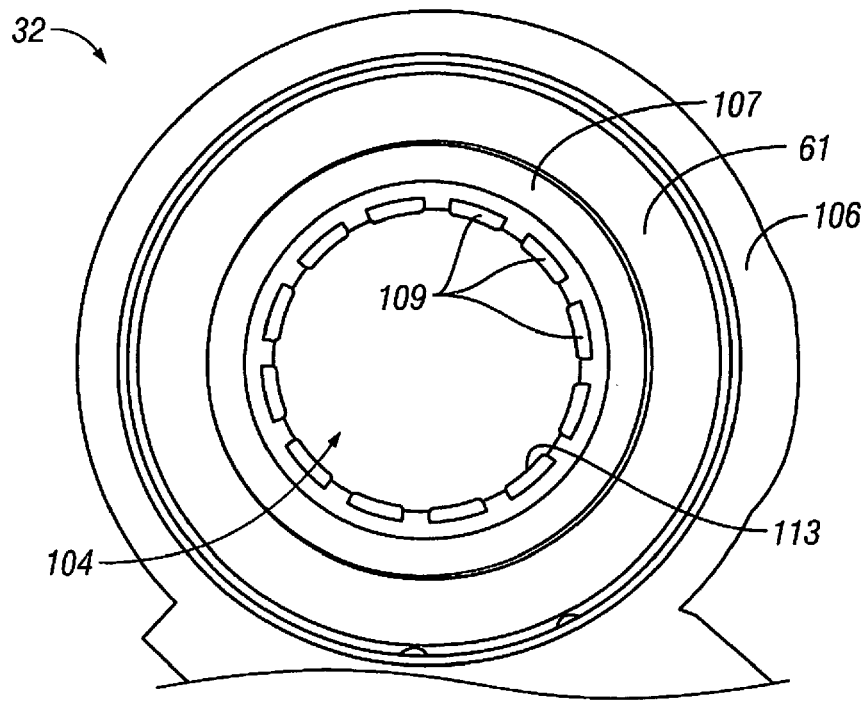
Figure 22:
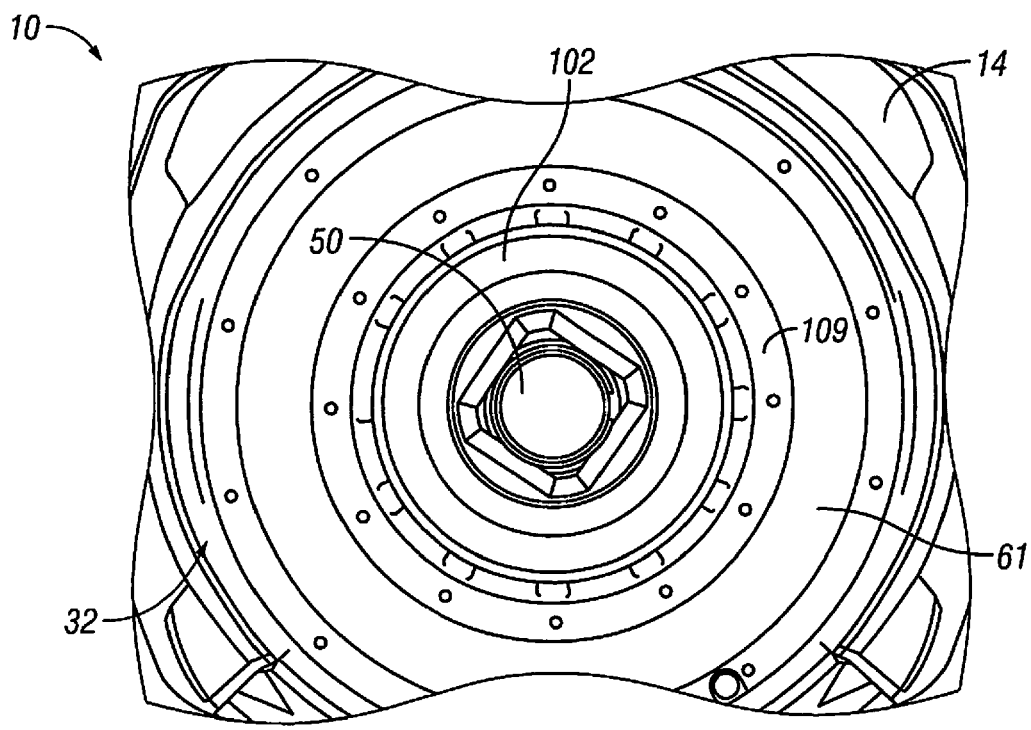
Figure 23:
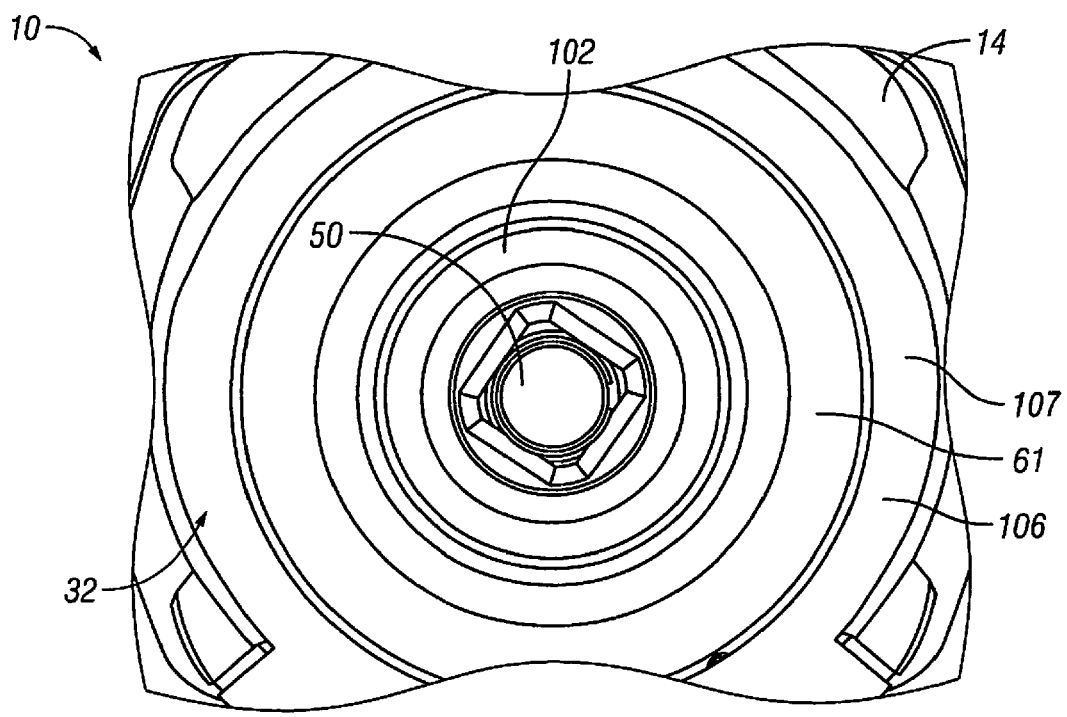
Figure 24:
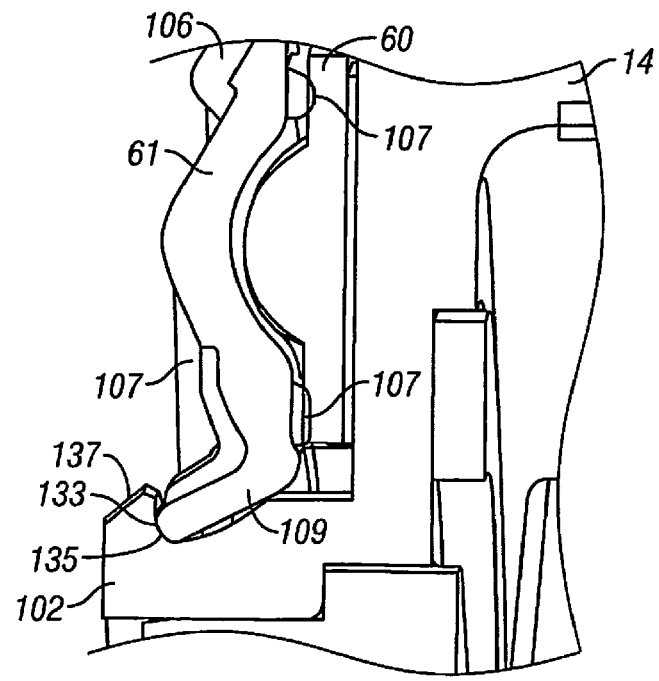
FIGS. 24 and 25 are cross-sectional side elevation views showing detail of overmolding on the nose piece and one or more retaining clips of the nose piece of the power tool of FIG. 1.
Figure 25:
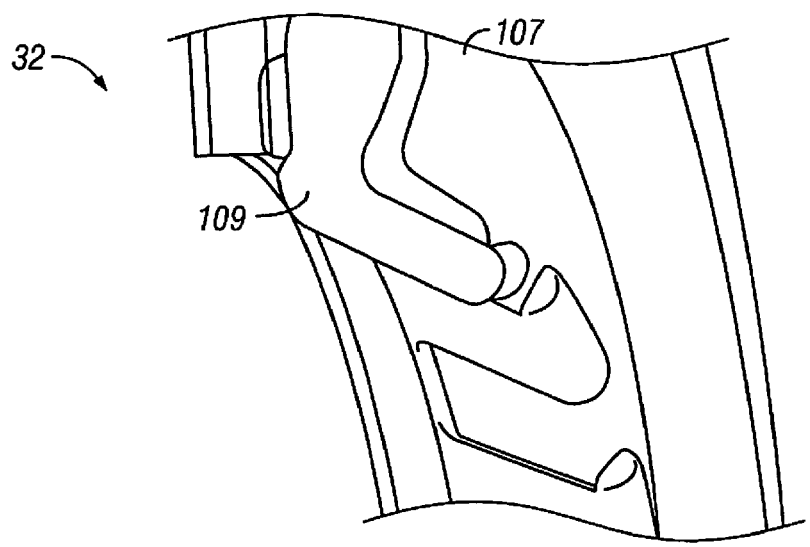

FIGS. 20 and 22 show nose piece 32 without overmolding 106 and FIGS. 21 and 23 show nose piece 32 with overmolding 106. FIGS. 20 and 22 show the one or more retaining clips 109 spaced radially around the opening 113 of nose piece 32. Gaps 115 are formed between each of retaining clips 109. In FIG. 22, the one or more retaining clips 109 are engaged with annular flange 102 of the output end of hammer case 14. As shown in FIGS. 21 and 23, overmolding 106 of nose piece 32 also includes an inner overmolding 107. The inner overmolding 107 extends from the retaining clips 109 of nose piece 32 onto lens 61. As shown in FIG. 25, inner overmolding 107 partially fills any gaps 165 (See FIG. 20) between the one or more retaining clips 109 providing structure support for the same. Inner overmolding 107 also seals the interior portions of nose piece 32 from foreign debris. As shown in FIG. 24, a rubber overmolding 106 is positioned between lens 61 and the lighting unit 60 and is configured to support the lighting unit's PCB with an interference fit. Overmolding 106 also extends from about an outer diameter of lighting unit 60 and around an outer surface of frame 111 of the nose piece 32. In some embodiments, overmolding 106 covers part of lens 61. As shown in FIGS. 6, 7, 18, and 19, overmolding 106 extends from lens 61, along frame 111, and terminates near nose piece electrical connector 62.

The one or more retaining clips 109 are configured to engage the annular flange 102 of hammer case 14 and secure nose piece 32 to hammer case 14. As shown in FIG. 24, each retaining clip 109 includes a rounded end 133 configured to be received by a rounded surface 135 in the annular flange 102. The interaction between annular flange 102 and the retaining clips 109 secures nose piece 32 to hammer case 14. Annular flange 102 also includes a chamfer 137 surface that is configured to deflect the retaining clips 109 inwardly toward lens 61, as nose piece 32 is advanced onto hammer case 14. Once nose piece 32 has passed a certain distance through aperture 104, retaining clips 109 deflect back outwardly and engage the rounded surface 135.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A hand-held power tool comprising:
a housing assembly supporting a motive source;
an output spindle protruding from an output end of the housing assembly;
wherein the output spindle is functionally coupled to the motive source such that the output spindle rotates in response to activation of the motive source when the motive source is supplied with power;
at least one handle extending from the housing assembly;
a nosepiece removably attached to the output end of the housing assembly;
wherein the nosepiece supports one or more chip-on-board (COB) light emitting diodes (LED) located adjacent the output spindle;
wherein the nosepiece and the housing assembly form an electrical connection assembly that provides electrical power to the nosepiece;
wherein the electrical connection assembly includes a first electrical connector supported by the nosepiece configured to mate with a second electrical connector supported on the housing assembly;
wherein the nosepiece further comprises at least one retaining clip at the periphery of an aperture disposed through the nosepiece,
wherein the output end of the housing assembly comprises an annular flange; and
wherein the retaining clip engages the annular flange comprised by the output end of the housing assembly to selectively couple the nosepiece with the housing assembly.

2. The hand-held power tool of claim 1, wherein the one or more COB LED form a path adjacent at least a portion of the output spindle, wherein the path is selected from the group consisting of an annular ring around the output spindle, one or more linear paths, one or more curved paths, and U-shaped pattern.

3. The hand-held power tool of claim 1, wherein actuation of the trigger supplies power to a controller, wherein the controller initiates the plurality of functions of the one or more COB LED selected from the group consisting of operating as a visual indicator, an operational condition of the power tool, and aesthetic lighting.

4. The hand-held power tool of claim 1, wherein initiating at least one function of the plurality of functions is caused by actuating the trigger multiple times.

5. The hand-held power tool of claim 1, further comprising a protective lens coupled to the nosepiece and covering the one or more COB LED to prevent contamination or damage to the one or more COB LED as well as wires, and connections related to the one or more COB LED.

6. The hand-held power tool of claim 1, further comprising a timer electrically connected to a controller such that initiating at least one function of the plurality of functions caused by actuating the trigger sets the timer to maintain illumination of the one or more COB LED for a predetermined duration of time.

7. The hand-held power tool of claim 1, wherein the trigger is configured such that when the trigger is partially depressed the trigger activates the one or more COB LED, and wherein when the trigger is further partially depressed the trigger activates the motive source.

8. The hand-held power tool of claim 1, further comprising an overmolding that covers an exterior surface of the nosepiece including at least a portion of the at least one retaining clip, but the overmolding does not shroud light emitting from the one or more COB LED.

9. The hand-held power tool of claim 8, wherein the overmolding is made of rubber.

10. The hand-held power tool of claim 5, further comprising an overmolding on at least a portion of the nosepiece that forms a seal at the protective lens to prevent contamination or damage to the one or more COB LED.

11. The hand-held power tool of claim 1, wherein the electrical connection assembly of the nosepiece and the housing assembly comprise a male terminal assembly that mates with a corresponding female terminal assembly to create the electrical connection between the nosepiece and the housing assembly, wherein the male and female terminal assemblies connect when the nosepiece and housing assembly removably attach to each other.

12. The hand-held power tool of claim 11, wherein the male terminal assembly comprises at least one electrical conducting pin and the female terminal assembly comprises at least one electrical conducting socket configured to receive the at least one electrical conducting pin.

13. The hand-held power tool of claim 12, wherein the at least one electrical conducting pin is comprised of first and second electrical conducting blades and the at least one electrical conducting socket comprises first and second electrical conducting sockets configured to receive the first and second electrical conducting blades, respectively, wherein each of the first and second electrical conducting sockets are made from a pair of opposing beams that form a pincer near ends of the pair of opposing beams which are spaced apart from each other, and wherein the ends of the pair of opposing beams are flared outward from each other to assist guiding first and second electrical conducting blades into a slot defined between the two beams.

14. The hand-held power tool of claim 1, wherein the nosepiece includes a piloting member that extends from the nosepiece and is configured to guide the nosepiece to mate the female and male terminal assemblies, assist removably attaching the nosepiece to the housing assembly, and cover the electrical connection assembly.

15. The hand-held power tool of claim 14, wherein the piloting member is composed of at least one flange configured to interface with a receiving structure on the housing assembly to guide the nosepiece onto the housing assembly.

16. A hand-held power tool comprising:
a housing assembly supporting a motive source;
an output spindle protruding from an output end of the housing assembly;
wherein the output spindle is functionally coupled to the motive source such that the output spindle rotates in response to activation of the motive source when the motive source is supplied with power;
a handle extending from the housing;
wherein the handle includes a trigger configured to be actuated to initiate a plurality of functions;
wherein the housing supports one or more of chip-on-board (COB) light emitting diodes (LED) at the output end of the housing;
wherein the one or more of COB LED are located adjacent the output spindle and are embodied in a carrier and lens assembly that includes an aperture and at least one retaining clip positioned along a periphery of the aperture; and
wherein the carrier and lens assembly substantially surrounds the output spindle, is removably attached to the housing via the at least one retaining clip, and is fashioned with electrical connection junctions that become electrically connected to the housing when the at least one retaining clip is attached to the housing.

17. A method of fashioning a hand-held power tool, the method comprising:
providing a housing assembly supporting a motive source and also fixedly supporting a housing-to-LED electrical connection;
providing an output spindle protruding from an output end of the housing assembly;
wherein the output spindle is functionally coupled to the motive source such that the output spindle rotates in response to activation of the motive source when the motive source is supplied with power;
providing a support structure comprising one or more chip-on-board (COB) light emitting diodes (LED), and further comprising one or more clips and an LED-to-housing electrical connection spaced apart from the one or more clips and fixedly mounted to the support structure; and
attaching the support structure to the housing in one step;
wherein attaching the support structure to the housing in one step includes substantially simultaneously engaging the one or more clips of the support structure to the housing and operatively connecting the fixedly supported housing-to-LED electrical connection with the fixedly mounted LED-to-housing electrical connection.

18. The method of claim 17, wherein engaging the one or more clips of the support structure to the housing includes:
deflecting the one or more clips.

19. The method of claim 17, wherein engaging the one or more clips of the support structure to the housing includes:
engaging the one or more clips of the support structure with an annular flange of the housing.

20. The method of claim 17, wherein connecting the fixedly supported housing-to-LED electrical connection with the fixedly mounted LED-to-housing electrical connection includes:
flexing the housing-to-LED electrical connection such that the housing-to-LED electrical connection applies a pinching force to the LED-to-housing electrical connection.

* * * * *